(12) United States Patent
Veerabhadrappa et al.

(10) Patent No.: US 10,252,245 B2
(45) Date of Patent: Apr. 9, 2019

(54) HIGH TEMPERATURE LAYERED MIXED-METAL OXIDE MATERIALS WITH ENHANCED STABILITY

(71) Applicants: Saudi Arabian Oil Company, Dhahran (SA); Durham University, Durham (GB)

(72) Inventors: Manohara Gudiyor Veerabhadrappa, Durham (GB); Hugh Christopher Greenwell, Durham (GB); Gasan Selman Alabedi, Cheshire (GB); John Adrian Hall, Dhahran (SA); Andrew Whiting, Durham (GB)

(73) Assignees: Saudi Arabian Oil Company, Dhahran (SA); Durham University, Durham (GB)

( * ) Notice: Subject to any disclaimer, the term of this patent is extended or adjusted under 35 U.S.C. 154(b) by 0 days.

(21) Appl. No.: 15/453,056

(22) Filed: Mar. 8, 2017

(65) Prior Publication Data

US 2017/0266642 A1    Sep. 21, 2017

Related U.S. Application Data

(60) Provisional application No. 62/309,647, filed on Mar. 17, 2016.

(51) Int. Cl.
  *B01J 20/08*    (2006.01)
  *B01J 20/02*    (2006.01)
  (Continued)

(52) U.S. Cl.
  CPC ............. *B01J 23/02* (2013.01); *B01D 53/02* (2013.01); *B01D 53/62* (2013.01); *B01D 53/81* (2013.01);
  (Continued)

(58) Field of Classification Search
  None
  See application file for complete search history.

(56) References Cited

U.S. PATENT DOCUMENTS 3,342,880 A    9/1967 Reinhardt
3,671,432 A    6/1972 Peters et al.
(Continued)

FOREIGN PATENT DOCUMENTS

CA    2594060 A1    6/2006
CN    105017485 A    11/2015
(Continued)

OTHER PUBLICATIONS

Moorhead-Rosenberg et al., "A Rapid Microwave-Assisted Solvothermal Approach to Lower-Valent Transition Metal Oxides", Inorg. Chem., 2013, 52, 13087-13093, American Chemical Society.
(Continued)

*Primary Examiner* — Daniel Berns
(74) *Attorney, Agent, or Firm* — Dinsmore & Shohl LLP

(57) ABSTRACT

Embodiments of the present disclosure are directed towards methods for preparing mixed-metal oxide particles by heating adamantane-intercalated layered double-hydroxide (LDH) particles at a reaction temperature of from 400° C. to 800° C. to form mixed-metal oxide particles. The adamantane-intercalated LDH particles have a general formula $[M_{1-x}Al_x(OH)_2](A)_x \cdot mH_2O$, where x is from 0.14 to 0.33, m is from 0.33 to 0.50, M is chosen from Mg, Ca, Co, Ni, Cu, or Zn, and A is adamantane carboxylate, and an aspect ratio greater than 100. The aspect ratio is defined by the width of an adamantane-intercalated LDH particle divided by the thickness of the adamantane-intercalated LDH particle. The mixed-metal oxide particles comprise a mixed-metal oxide phase containing M, Al or Fe, and carbon.

10 Claims, 19 Drawing Sheets

(51) Int. Cl.

| | | |
|---|---|---|
| *B01J 20/04* | (2006.01) | |
| *B01J 20/06* | (2006.01) | |
| *B01J 20/20* | (2006.01) | |
| *B01J 20/22* | (2006.01) | |
| *B01J 20/28* | (2006.01) | |
| *B01J 20/30* | (2006.01) | |
| *B01J 21/10* | (2006.01) | |
| *B01J 21/18* | (2006.01) | |
| *B01J 23/00* | (2006.01) | |
| *B01J 23/02* | (2006.01) | |
| *B01J 23/72* | (2006.01) | |
| *B01J 23/75* | (2006.01) | |
| *B01J 23/78* | (2006.01) | |
| *B01J 37/08* | (2006.01) | |
| *B01D 53/86* | (2006.01) | |
| *C02F 1/28* | (2006.01) | |
| *B01D 53/62* | (2006.01) | |
| *B01J 31/06* | (2006.01) | |
| *B01D 53/02* | (2006.01) | |
| *B01D 53/81* | (2006.01) | |
| *C02F 101/10* | (2006.01) | |
| *C02F 101/12* | (2006.01) | |
| *C02F 101/22* | (2006.01) | |

(52) U.S. Cl.
CPC ..... *B01D 53/8659* (2013.01); *B01D 53/8671* (2013.01); *B01J 20/041* (2013.01); *B01J 20/08* (2013.01); *B01J 20/205* (2013.01); *B01J 20/28028* (2013.01); *B01J 20/3078* (2013.01); *B01J 21/10* (2013.01); *B01J 21/18* (2013.01); *B01J 23/002* (2013.01); *B01J 23/007* (2013.01); *B01J 31/069* (2013.01); *B01J 37/086* (2013.01); *B01J 37/088* (2013.01); *C02F 1/281* (2013.01); *C02F 1/283* (2013.01); *B01D 2253/1124* (2013.01); *B01D 2255/2045* (2013.01); *B01D 2255/2047* (2013.01); *B01D 2255/2092* (2013.01); *B01D 2255/20746* (2013.01); *B01D 2255/20753* (2013.01); *B01D 2255/20761* (2013.01); *B01D 2255/20792* (2013.01); *B01D 2255/40* (2013.01); *B01D 2255/702* (2013.01); *B01D 2257/2042* (2013.01); *B01D 2257/304* (2013.01); *B01D 2257/504* (2013.01); *B01D 2257/55* (2013.01); *B01D 2257/60* (2013.01); *B01D 2257/93* (2013.01); *B01J 2220/46* (2013.01); *C02F 2101/101* (2013.01); *C02F 2101/103* (2013.01); *C02F 2101/105* (2013.01); *C02F 2101/12* (2013.01); *C02F 2101/22* (2013.01); *Y02C 10/08* (2013.01)

(56) References Cited

U.S. PATENT DOCUMENTS

| | | | |
|---|---|---|---|
| 4,021,371 | A | 5/1977 | Petro et al. |
| 4,419,222 | A | 12/1983 | Grenoble et al. |
| 4,774,212 | A | 9/1988 | Drezdon |
| 4,952,748 | A | 8/1990 | Alexander et al. |
| 4,956,481 | A | 9/1990 | Gillaspey et al. |
| 5,021,184 | A | 6/1991 | Gillaspey et al. |
| 5,073,532 | A | 12/1991 | Domesle et al. |
| 5,260,495 | A | 11/1993 | Forkner |
| 5,326,891 | A | 7/1994 | Breuer et al. |
| 5,399,329 | A | 3/1995 | Schutz et al. |
| 5,635,457 | A | 6/1997 | Van Slyke |
| 5,883,041 | A | 3/1999 | Pak et al. |
| 6,096,690 | A | 8/2000 | Wittenbrink et al. |
| 6,323,270 | B1 | 11/2001 | Ishida |
| 6,410,635 | B1 | 6/2002 | Kaylo et al. |
| 6,429,314 | B1 | 8/2002 | Ishii et al. |
| 7,098,366 | B2 | 8/2006 | Sigl et al. |
| 7,129,287 | B1 | 10/2006 | Lee et al. |
| 7,557,063 | B2 | 7/2009 | Hagemeyer et al. |
| 7,582,202 | B2 | 9/2009 | Jones et al. |
| 7,918,935 | B2 | 4/2011 | Park et al. |
| 8,034,867 | B2 | 10/2011 | Abarca et al. |
| 8,088,349 | B2 | 1/2012 | Duan et al. |
| 8,158,843 | B2 | 4/2012 | Song et al. |
| 8,613,900 | B2 | 12/2013 | Frei et al. |
| 8,652,994 | B2 | 2/2014 | Li et al. |
| 2002/0110520 | A1 | 8/2002 | Stamires et al. |
| 2008/0108498 | A1 | 5/2008 | Duan et al. |
| 2008/0207801 | A1 | 8/2008 | Ton-That et al. |
| 2010/0279848 | A1 | 11/2010 | Iyi et al. |
| 2011/0237430 | A1 | 9/2011 | Zhang et al. |
| 2011/0248314 | A1 | 10/2011 | Takei et al. |
| 2012/0058739 | A1 | 3/2012 | McKinzie, III et al. |
| 2012/0258857 | A1 | 10/2012 | Pham et al. |
| 2012/0312344 | A1 | 12/2012 | Delorme |
| 2012/0322694 | A1 | 12/2012 | Monteiro et al. |
| 2013/0116351 | A1 | 5/2013 | Querner et al. |
| 2013/0143731 | A1 | 6/2013 | Li et al. |
| 2013/0172642 | A1 | 7/2013 | Behrens et al. |
| 2013/0260990 | A1 | 10/2013 | Kwon et al. |
| 2014/0113196 | A1 | 4/2014 | Balaya et al. |
| 2015/0027710 | A1 | 1/2015 | Miller |
| 2017/0029375 | A1 | 2/2017 | Harichian et al. |
| 2017/0267620 | A1 | 9/2017 | Veerabhadrappa et al. |
| 2017/0267623 | A1 | 9/2017 | Veerabhadrappa et al. |
| 2017/0267910 | A1 | 9/2017 | Mohammed et al. |

FOREIGN PATENT DOCUMENTS

| | | |
|---|---|---|
| EP | 1419817 A1 | 5/2004 |
| EP | 1952885 A1 | 8/2008 |
| EP | 2263976 A1 | 12/2010 |
| WO | 0224756 A2 | 3/2002 |
| WO | 2013007993 A2 | 1/2013 |
| WO | 2013072197 A1 | 5/2013 |
| WO | 2014037378 A1 | 3/2014 |
| WO | 2014052510 A1 | 4/2014 |
| WO | 2014080428 A1 | 5/2014 |

OTHER PUBLICATIONS

Schwertfeger et al., "Diamonds are a Chemist's Best Friend: Diamondoid Chemistry Beyond Adamantane", Angew. Chem. Int. Ed., 2008, 47, 1022-1036, Wiley-VCH GmbH & Co.

Schwertmann et al., "The Formation of Green Rust and Its Transformation to Lepidocrocite", Clay Minerals, 1994, 29, 87-92, The Mineralogical Society.

Singoredjo et al., "Alumina Supported Manganese Oxides for the Low-Temperature Selective Catalytic Reduction of Nitric Oxide with Ammonia", Applied Catalysis B: Environmental, 1992, 1, 297-316, Elsevier Science Publishers B.V.

Spaldin et al., "The Renaissance of Magnetoelectric Multiferroics", Science, 2005, 309, 391-392, AAAS.

Spyrou et al., "Towards Novel Multifunctional Pillared Nanostructures: Effective Intercalation of Adamantylamine in Graphene Oxide and Smectite Clays", Adv. Funct. Mater., 2014, 24, 2841-5850, Wiley-VCH Verlag GmbH & Co.

Stankic el al., "Size-Dependent Optical Properties of MgO Nanocubes", Angew. Chem. Int. Ed., 2005, 44, 4917-4920, Wiley-VCH Verlag GmbH & Co.

Stein et al., "Salt-Gel Synthesis of Porous Transition-Metal Oxides", Chem. Mater., 1995, 7, 304-313, American Chemical Society.

Tao et al., "Synthesis and Characterization of Layered Double Hydroxides with a High Aspect Ratio", Journal of Solid State Chemistry, 2006, 179, 708-715, Elsevier Inc.

Tian et al., "Manganese Oxide Mesoporous Structures: Mixed-Valent Semiconducting Catalysts", Science, 1997, 276, 926-930.

Tokura et al., "Orbital Physics in Transition-Metal Oxides", Science, 2000, 288, 462-468.

(56) References Cited

OTHER PUBLICATIONS

Vidal-Michel et al., "Effect of Crystal Size on the Oxidative Dehydrogenation of Butane on V/MgO Catalysts", Journal of Catalysis, 2004, 221, 127-136, Elsevier Inc.
Walia et al., "Transition Metal Oxides—Thermoelectric Properties", Progress in Materials Science, 2013, 58, 1443-1489, Elsevier Ltd.
Wang et al., "Electronics and Optoelectronics of Two-Dimensional Transition Metal Dichalcogenides", Nature Nanotechnology, 2012, 7, 699-712, Macmilan Publishers.
Wang et al., "$CO_2$ Capture by Solid Adsorbents and Their Applications: Current Status and New Trends", Energy Environ. Sci., 2011, 4, 42-55, The Royal Society of Chemistry.
Westerhaus et al., "Heterogenized Cobalt Oxide Catalysts for Nitroarene Reduction by Pyrolysis of Molecularly Defined Complexes", Nature Chemistry, 2013, 5, 537-543.
Xie et al., "Low-Temperature Oxidation of CO Catalysed by $Co_3O_4$ Nanorods", Nature, 2009, 458, 746-749, Macmilian Publishers Limited.
Xu et al., "Surface Area and Thermal Stability Effect of the MgO Supported Catalysts for the Synthesis of Carbon Nanotubes", Journal of Materials Chemistry, 2008, 18, 5738-5745, The Royal Society of Chemistry.
Zhang et al., "Synthesis and Transformation of Linear Adamantane Assemblies Inside Carbon Nanotubes", ACS Nano, 6:10, 8674-8683.
Zhang et al., "Hydrogen Production via the Direct Cracking of Methane Over Silica-Supported Nickel Catalysts", Applied Catalysts A: General, 1998, 167, 161-172, Elsevier B.V.
Zhuang et al., "Comparative Study on the use of Cationic-Nonionic-Organo-Montmorillonite in Oil-Based Drilling Fluids", Applied Clay Science, 2015, 116-117, 257-262, Elsevier B.V.
International Search Report and Written Opinion pertaining to PCT/US2017/021135 dated Jun. 12, 2017.
International Search Report and Written Opinion pertaining to PCT/US2017/022427 dated Jun. 12, 2017.
International Search Report and Written Opinion pertaining to PCT/US2017/021478 dated May 29, 2017.
Lu et al., "Sheet-like and Fusiform CuO Nanostructures Grown on Graphene by Rapid Microwave Heating for High Li-Ion Storage Capacities", J. Mater. Chem., 2011, 21, 17916.
Huang et al., "Controllable Preparation of Nano-MgO and Investigation of its Bactericidal Properties", Journal of Inorganic Biochemistry, 2005, 99, 986-996.
Non-Final Office Action dated May 25, 2018, pertaining to U.S. Appl. No. 15/449,207.
International Search Report dated Jul. 13, 2017, pertaining to PCT/US2017/021550, filed Mar. 9, 2017, 8 pages.
Written Opinion dated Jul. 13, 2017, pertaining to PCT/US2017/021550, filed Mar. 9, 2017, 13 pages.
U. Costantino, et al., Preparation and characterization of hydrotalcite/carboxyadamantane intercalation compounds as fillers of polymeric nanocomposites, Journal of Materials Chemistry, vol. 17, No. 11, Dec. 22, 2006, pp. 1079-1086.
Goh, et al., Application of layered double hydroxides for removal of oxyanions: A review, Water Research, Elsevier, vol. 42, No. 6-7, Nov. 7, 2007, pp. 1343-1368, Amsterdam, Netherlands.
Kanezaki, Unexchangeable Interlayer Anions: Synthesis and Characterization of Zn/Al- and Mg/Al-Layered Double Hydroxides with Interlayer Alizarin red S, Journal of Inclusion Phenomena and Macrocyclic Chemistry, Jun. 1, 2003, pp. 89-95, https://rd.springer.com.
Crepaldi, et al., Sorption of terephthalate anions by calcined and uncalcined hydrotalcite-like compounds, Colloids and Surfaces A: Physicochem. Eng. Aspects 211, vol. 211, No. 2-3, Jun. 4, 2002, pp. 103-114, Amsterdam, Netherlands.
Sabbar, et al., Probing the interaction between di- and tri-functionalized carboxy-phosphonic acid and LDH layer structure, Journal of Physics and Chemistry of Solids, Pergamon Press, vol. 67, No. 11, Sep. 6, 2006, pp. 2419-2429, London, England.

Lima, et al., Characterization of basic catalysts by the use of nitromethane as NMR probe molecule and reactant, Journal of Cataly, Academic Press, vol. 223, No. 1, Feb. 20, 2004, pp. 28-35, USA.
Khan et al., The intercalation of bicyclic and tricyclic carboxylates into layered double hydroxides, Journal of Solid State Chemistry, vol. 183, No. 12, Sep. 30, 2010, pp. 2877-2885, USA.
Chen et al., "$Cu_2(ATC)$ $6H_2O$: Design of Open Metal Sites in Porous Metal-Organic Crystals (ATC: 1,3,5,70Adamantane Tetracarboxylate", J. Am. Chem. Soc., 2000, 122, 11559-11560.
Kim et al., "Assembly of Metal-Organic Frameworks from Large Organic and Inorganic Secondary Building Units: New Examples and Simplifying Principles for Complex Structures", J. Am. Chem. Soc., 2001, 123, 8239-8247.
Cavani et al., Hydrotalcite-Type Anionic Clays: Preparation, Properties and Applications, Catalysis Today, vol. 11, 1991, 173-301, Elsevier Science Publishers B.V.
Chang, et al., "Ca-Rich Ca—Al-Oxide, High-Temperature-Stable Sorbents Prepared from Hydrotalcite Precursors: Synthesis, Characterization, and $CO_2$ Capture Capacity", ChemSusChem, 2011, vol. 4, 1844-1851, Wiley-VCH.
Chen, et al., "Preparation and Characterization of Flexible Asymmetric Supercapacitors Based on Transition-Metal-Oxide Nanowire/Single-Walled Carbon Nanotube Hybrid Thin-Film Electrodes", ACSNano, 2010, vol. 4, No. 8, 4403-4411, American Chemical Society.
Damodara et al., "Copper Nanoparticles from Copper Aluminum Hydrotalcite: An Efficient Catalyst for Acceptor- and Oxidant-Free Dehydrogenation of Amines and Alcohols", Adv. Synth. Catal., 2014, vol. 356, 189-198, Wiley-VCH.
Del Arco et al., "Release studies of different NSAIDS encapsulated in Mg, Al, Fe-hydrotalcites" Applied Clay Science, vol. 42, 2009, 538-544, Elsevier B.V.
Ding, et al., "Equilibria and kinetics of $CO_2$ absorption on hydrotalcite adsorbent" Chemical Engineering Science, 2000, vol. 55, 3461-3474, Elsevier Science Ltd.
Gardolinski et al., "Grafted organic derivatives of kaolinite: II. Intercalation of primary n-alkylamines and delamination", Clay Minerals, 2005, vol. 40, 547-556, The Mineralogical Society.
Itoh, et al., Nanoscale Metal Oxide Particles as Chemical Reagents. Intrinsic Effects of Particle Size on Hydroxyl Content and on Reactivity and Acid/Base Properties of Ultrafine Magnesium Oxide, Chem. Mater. 1993, vol. 5, 71-77, American Chemical Society.
Khan, et al., "Intercalation chemistry of layered double hydroxides: recent developments and applications", Journal of Materials Chemistry, 2002, vol. 12, 3191-3198, The Royal Society of Chemistry.
Kumar, et al., "Sonochemical Synthesis and Characterization of Nanometer-Size Transition Metal Oxides from Metal Acetates" Chem. Mater. 2000, vol. 12, 2301-2405, American Chemical Society.
Kumbhar, et al., Reduction of Aromatic Nitro Compounds with Hydrazine Hydrate in the Presence of the Iron(III) Oxide-MgO Catalyst Prepared from a Mg—Fe Hydrotalcite Precursor, Tetrahedron Letters, 1998, vol. 39, 2573-2574, Elsevier Science Ltd.
Kumbhar, et al., Mg—Fe Hydrotalcite as a Catalyst for the Reduction of Aromatic Nitro Compounds with Hydrazine Hydrate, Journal of Catalysis, 2000, vol. 191, 467-473, Academic Press.
Li, et al., "$Mg(OH)_2$@reduced graphene oxide composite for removal of dyes from water", Journal of Materials Chemistry, 2011, vol. 21, 13765-13768, The Royal Society of Chemistry.
Meyn et al., "Anion-Exchange Reactions of Layered Double Hydroxides" Inorg. Chem. 1990, vol. 29, 5201-5207, American Chemical Society.
Miyata, Shigeo, "Physico-Chemical Properties of Synthetic Hydrotalcites in Relation to Composition", Clays and Clay Minerals, 1980, vol. 28, No. 1, 50-56, The Clay Minerals Society.
Mulukutla, C. Detellier, "Thermally activated Mg, Fe layered double hydroxide as reductant for nitric oxide", Journal of Materials Science Letters 1996, vol. 15, 797-799, Chapman & Hall.
Nethrvathi, et al., Cobalt Hydroxide/Oxide Hexagonal Ring-Graphene Hybrids through Chemical Etching of Metal Hydroxide Platelets by Graphene Oxide: Energy Storage Applications, ASCNano, 2014, vol. 8, No. 3, 2755-2765, American Chemical Society.

(56) References Cited

OTHER PUBLICATIONS

Poizot et al., Nano-sized transition-metal oxides as negative-electrode materials for lithium-ion batteries, Nature, 2000, vol. 407, pp. 496-499, Macmillan Magazines Ltd.

Prasanna, et al., Chromate uptake characteristics of pristine layered double hydroxides of Mg with Al, Solid State Sciences, 2008, vol. 10, 260-266, Elsevier Masson SAS.

Reichle, Walter T., "Catalytic Reactions by Thermally Activated Anionic Clay Minerals" Journal of Catalysis, 1985, vol. 94, 547-557, Academic Press, Inc.

Shukla, et al., "Stabilized a-Ni(OH)2 as Electrode Material for Alkaline Secondary Cells", J. Electrochem Soc., 1994, vol. 141, No. 11, 2956-2959, The Electrochemical Society, Inc.

Tao et al., "A redox-stable efficient anode for solid-oxide fuel cells" Nature Materials, 2003, vol. 2, 320-323, Nature Publishing Group.

Wang, et al., "Synthesis of high-temperature CO2 adsorbents from organo-layered double hydroxides with markedly Improved CO2 capture capacity" The Royal Society of Chemistry, 2012, vol. 5, 7526-7530, Energy Environ. Sci.

White et al., Supported metal nanoparticles on porous materials. Methods and Applications; The Royal Society of Chemistry 2009, vol. 38, 481-494, Chemical Society Reviews.

Williams, et al., "Towards understanding, control and application of layered double hydroxide chemistry", Journal of Materials Chemistry, 2006, vol. 16, 3065-3074, Journal of Materials Chemistry.

Yao, et al., "Confined adamantane molecules assembled to one dimension in carbon nanontubes" Carbon, 2011, vol. 49, 1159-1166, Elsevier Ltd.

Yavuz, et al., "Markedly Improved CO2 Capture Efficiency and Stability of Gallium Substituted Hydrotalcites at Elevated Temperatures" Chem. Mater. 2009, vol. 21, 3473-3475, American Chemical Society.

Zhao, et al., "Carbon Nanowire Made of a Long Lineal Carbon Chain Inserted Inside a Multiwalled Carbon Nanotube", Physical Review Letters, 2003, vol. 90, No. 18, 187401-1-187401-4, The American Physical Society.

Non-Final Office Action dated Jan. 5, 2018 pertaining to U.S. Appl. No. 15/453,106, filed Mar. 8, 2017.

Vittal, The Chemistry of Inorganic and Organometallic Compounds with Adamantane-Like Structures.: Polyhedron, vol. 15, No. 10, pp. 1585-1642 (1996).

Non-Final Office Action dated Jan. 5, 2018 pertaining to U.S. Appl. No. 15/453,180, filed Mar. 8, 2017.

Non-Final Office Action dated Apr. 23, 2018 pertaining to U.S. Appl. No. 15/449,347, filed Mar. 3, 2017.

International Search Report dated Jul. 13, 2017, pertaining to PCT/US2017/022485, filed Mar. 15, 2017, 7 pages.

Written Opinion dated Jul. 13, 2017, pertaining to PCT/US2017/022485, filed Mar. 15, 2017, 11 pages.

Abdo et al., "Clay Nanoparticles Modified Drilling Fluids for Drilling of Deep Hydrocarbon Wells", Applied Clay Science, 2013, 86, 76-82, Elsevier B.V.

Abdou et al., "Evaluation of Egyptian Bentonite and Nano-Bentonite as Drilling Mud", Egyptian Journal of Petroleum, 2013, 22, 53-59, Egyptian Petroleum Research Institute.

Alvarado et al., "Preparation and Characterization of MgO Powders Obtained from Different Magnesium Salts and the Mineral Dolomite", Polyhedron, 2000, 19, 2345-2351, Elsevier Science B.V.

Baltes et al., "Synthesis of Supported Transition Metal Oxide Catalysts by the Designed Deposition of Acetylacetonate Complexes", Langmuir, 1999, 15, 5841-5845, American Chemical Society.

Bednorz et al., "Possible High Tc Superconductivity in the Ba—La—Cu—O System", Condensed Matter, 1986, 64, 189-193, Springer-Verlag.

Bernholc et al., "Bronsted Acid Sites in Transition Metal Oxide Catalysts: Modeling of Structure, Acid Strengths, and Support Effects", J. Phys. Chem., 1987, 91, 1526-1530, American Chemical Society.

Cao et al., "Ultra-High Capacity Lithium-Ion Batteries with Hierarchical CoO Nanowire Clusters as Binder Free Electrodes", Advanced Functional Materials, 2015, 25, 1082-1089, Wiley-VCH Verlag GmbH & Co.

Cao et al., "Mg(OH)2 Complex Nanostructures with Superhydrophobicity and Flame Retardant Effects", J. Phys. Chem., 2010, 114, 17362-17368, American Chemical Society.

Choudary et al., "Benzylation of Aromatic Compounds with Different Crystallites of MgO", Journal of American Chemical Society, 2003, 125, 2020-2021, American Chemical Society.

Di Cosimo et al., "Basic Catalysis on MgO: Generation, Characterization and Catalytic Properties of Active Sites", Catalysis, 2014, 26, 1-28.

Gardolinski et al., "Grafted Organic Derivatives of Kaolinite: I. Synthesis, Chemical and Rheological Characterization", Clay Minerals, 2005, 40, 537-546, The Mineralogical Society.

Guo et al., "A Comprehensive Review on Synthesis Methods for Transition-Metal Oxide Nanostructures", CrystEngComm, 2015, 17, 3551-3585, The Royal Society of Chemistry.

Haber, Jerzy, "Catalysis by Transition Metal Oxides", ACS Symposium Series, Washington D.C., 1985, Grasselli and Brazdil: Solid State Chemistry in Catalysis, American Chemical Society.

Hermoso et al., "Influence of Viscosity Modifier Nature and Concentration on the Viscous Flow Behaviour of Oil-Based Drilling Fluids at High Pressure", Applied Clay Science, 2014, 87, 14-21, Elsevier B.V.

Hsueh et al., "Preparation and Properties of LDHs/Epoxy Nanocomposites", Polymer, 2003, 44, 5275-5283, Elsevier Ltd.

Huang et al., "Removal of NO by Reversible Adsorption on Fe—Mn Based Transition Metal Oxides", Langmuir, 2001, 17, 4997-5003, American Chemical Society.

Jagadeesh et al., "Selective Oxidation of Alcohols to Esters Using Heterogeneous Co3O4—N@C Catalysts Under Mild Conditions", Journal of the American Chemical Society, 2013, 135, 10776-10782, American Chemical Society.

Jiancheng et al., "A New Type of Whole Oil-Based Drilling Fluid", Petrol. Explor. Develop., 2014, 41(4), 538-544, Elsevier B.V.

Johnson, Mark, "Spintronics", J. Phys. Chem. B, 2005, 109, 14278-14291, American Chemical Society.

Kelkar et al., "Mi-, Mg- and Co-Containing Hydrotalcite-Like Materials with a Sheet-Like Morphology: Synthesis and Characterization", Microporous Materials, 1997, 10, 163-172, Elsevier Science BV.

Krishnamoorthy et al., "Catalytic Oxidation of 1,2-Dichlorobenzene Over Supported Transition Metal Oxides", Journal of Catalysis, 2000, 193, 264-272, Academic Press.

Kumar et al., "Sonochmical Synthesis and Characterization of Nanometer-Size Transition Metal Oxides from Metal Acetates", Chem .Mater., 2000, 12, 2301-2305, American Chemical Society.

Kumar et al., "Effect of MgO Nanoparticles on Ionic Conductivity and Electrochemical Properties of Nanocomposite Polymer Electrolyte", Journal of Membrane Science, 2007, 300, 104-110, Elsevier B.V.

Lebaron et al., "Polymer-Layered Silicate Nanocomposites: An Overview", Applied Clay Science, 1999, 15, 11-29, Elsevier Science B.V.

Li et al., "Electroreduction of Carbon Monoxide to Liquid Fuel on Oxide-Derived Nanocrystalline Copper", Nature, 2014, 508, 504-507, MacMilan Publishers.

Li et al., "Mg(OH)2@reduced Graphene Oxide Composite for Removal of Dyes From Water", Journal of Materials Chemistry, 2011, 21, 13765-13768, The Royal Society of Chemistry.

Li et al., "Preparation of Nanocomposites of Metals, Metal Oxides, and Carbon Nanotubes via Self-Assembly", J. Am. Chem. Soc., 2007, 129, 9401-9409, American Chemical Society.

Li et al., "Positively Charged Nanosheets Derived via Total Delamination of Layered Double Hydroxides", Chem. Mater., 2005, 17, 4386-4391, American Chemical Society.

Li et al., "Stable Platinum Nanoparticles on Specific MgAl2O4 Spinal Facets at High Temperatures in Oxidizing Atmospheres", Nature Communications, 2013, DOI: 10.1038/ncomms3481, MacMilan Publishers Limited.

(56) References Cited

OTHER PUBLICATIONS

Liu et al., "Layered Double Hydroxide Nano- and Microstructures Grown Directly on Metal Substrates and Their Calcined Products for Application as Li-Ion Battery Electrodes", Advanced Functional Materials, 2008, 18, 1448-1458, Wiley-VCH Verlag GmbH & Co.
Liu et al., "Gold-Catalyzed Direct Hydrogenative Coupling of Nitroarenes to Synthesize Aromatic Azo Compounds", Angew. Chem., 2014, 126, 7754-7758, Wiley-VCH Verlag GmbH & Co.
Liu et al., "Selective and Controlled Synthesis of a- and b- Cobalt Hydroxides in Highly Developed Hexagonal Platelets", J. Am. Chem. Soc., 2005, 127, 13869-13874, American Chemical Society.
Ma et al., "Metal-Organic Framework Derived Hybrd Co3O4-Carbon Porous Nanowire Arrays as Reversible Oxygen Evolution Electrodes", J. Am. Chem. Soc., 2014, 136, 13925-13931, American Chemical Society.
Makhluf et al., "Microwave-Assisted Synthesis of Nanocrystalline MgO and Its Use as a Bacteriocide", Adv. Funct. Mater., 2005, 15, 1708-1715, Wiley-VCH Verlag GmbH.
Mishra et al., "Effect of Nano-Mg(OH)2 on the Mechanical and Flame-Retarding Properties of Polypropylene Composites", Journal of Applied Polymer Science, 2004, 94, 116-122, Wiley Periodicals, Inc.
Nethravathi et al., "Synthesis and Anion-Exchange Reactions of a New Anionic Clay a-Magnesium Hydroxide", Journal of Colloid and Interface Science, 2011, 354, 793-797, Elsevier Inc.
Newman et al., "Comparative Study of Some Layered Hydroxide Salts Containing Exchangeable Interlayer Anions", Journal of Solid State Chemistry, 1999, 148, 26-40, Academic Press.
Nielsen et al., "Delamination, Synthesis, Crystal Structure and Thermal Properties of the Layered Metal-Organic Compound Zn(C12H14O4)", J. Mater. Chem., 2008, 18, 1002-1007, The Royal Society of Chemistry.
Ning et al., "Gas-Hydrate Formation, Agglomeration and Inhibition in Oil-Based Drilling Fluids for Deep-Water Drilling", Journal of Natural Gas Chemistry, 2010, 19, 234-240, Elsevier.
Oswald et al., "Bivalent Metal Hydroxides", Preparation and Crystal Growth of Materials with Layered Structures, 1977, 71-140.
Park et al., "Synthesis and Characterization of Al(OH)3/Polystyrene Nanocomposite Latex Particles by Emulsion Polymerization", Macromol. Symp., 2007, 247-250.
Pham et al., "A Silica-Supported Iron Oxide Catalyst Capable of Activating Hydrogen Peroxide at Neutral pH Values", Environ. Sci. Technol., 2009, 43, 8930-8935, American Chemical Society.
Pupovac et al., "Cu/MgAl2O4 as Bifunctional Catalyst for Aldol Condensation of 5-Hydroxymethylfurfural and Selective Transfer Hydrogenation", ChemSusChem, 2013, 6, 2103-2110.
Qian et al., "Micropore Modification of Zeolites with Transition-Metal Oxides", Colloids and Surfaces A: Physiochemical and Engineering Aspects, 2001, 180, 311-316, Elsevier Science B.V.
Rajamathi et al., "The Many Ways of Making Anionic Clays", Proc. Indian Acad. Sci. (Chem. Sci.), 2001, 5 & 6, 671-680, Indian Academy of Sciences.
Ramirez, A.P., "Colossal Magnetoresistance", J. Phys.: Condens. Matter, 1997, 9, 8171-8199, IOP Publishing Ltd.
Rao et al. "Synthesis of Complex Metal Oxides by Novel Routes", Am. Chem. Res., 1987, 20, 228-235, American Chemical Society.
Rao, C.N.R., "Transition Metal Oxides", Annu. Rev. Phys. Chem., 1989, 40, 291-326, Annual Reviews Inc.
Raveau, B., "Transition Metal Oxides: Promising Functional Materials", Journal of the European Ceramic Society, 2005, 25, 1965-1969, Elsevier Ltd.
Reddy et al., "Metal Oxides and Oxysalts as Anode Materials for Li Ion Batteries", Chem. Rev. 2013, 113, 5364-5457, American Chemical Society.
International Search Report and Written Opinion dated Aug. 10, 2018 pertaining to International Application No. PCT/US2018/030399, 15 pages.
U. Costantino et al., Preparation and characterisation of hydrotalcite/carboxyadamantane intercalation compounds as fillers of polymeric nanocomposites, Journal of Materials Chemistry, 2007, vol. 17, pp. 1076-1086, www.rsc.org/materials, UK.
Makoto Ogawa, et al., Hydrothermal Synthesis of Layered Double Hydroxide-Deoxycholate Intercalation Compounds, Chemical Materials, 2000, vol. 12, pp. 3253-3255, USA.

HIGH TEMPERATURE LAYERED MIXED-METAL OXIDE MATERIALS WITH ENHANCED STABILITY

CROSS-REFERENCE TO RELATED APPLICATIONS

This application claims the benefit of U.S. Provisional Application Ser. No. 62/309,647 filed Mar. 17, 2016, incorporated herein by reference.

BACKGROUND

Field

Embodiments of the present disclosure generally relate to layered mixed-metal oxides, and specifically relate to mixed-metal oxide catalysts with high temperature stability.

Technical Background

The synthesis of supported metal or metal-oxide catalysts is of great industrial importance in heterogeneous catalysis. High activity, high selectivity, and long catalyst life are desirable characteristics of any industrial catalyst. Among the metal/metal oxide supported catalysts, the $Cu/ZnO/Al_2O_3$ system and metal/metal oxide (Pt, Pd, Rh and Au) systems supported on various supports (alumina, silica, and carbon) have great industrial importance. Generally these catalytic systems are prepared by methods such as sol-gel, deposition-precipitation, deposition-reduction, and impregnation methods. These synthetic methods are challenged with problems such as uneven distribution, deposition of active metal species onto the support leading to the agglomeration of particles and sintering of active species at higher temperature, as well as during recycling.

Mixed-metal oxide materials can be obtained by thermally decomposing layered double hydroxides (LDH) materials. LDHs are also known as anionic clays and are inverse charge analogues of the widely used aluminosilicate cationic clays in structure and properties. LDHs undergo thermal decomposition in three main steps: (a) from room temperature to 100° C., adsorbed/physisorbed water is removed; (b) from 100° C. to 220° C., intercalated water is removed; and (c) from 220° C. to 400° C., intercalated anions are removed and mineral layers are dehydroxylated, leading to the formation of an amorphous mixed-metal oxide residue. Mixed-metal oxide materials formed from heating an LDH to the temperature range of 220 to 400° C. are typically both amorphous and composed of a single-metal oxide phase ($M^{II}O$) and a spinel phase ($M^{II}M_2^{III}O_4$). The anion that was present in the parent LDH material is generally no longer present in the mixed-metal oxide material or is present to such a small extent that it does not noticeably affect the properties of the mixed-metal oxide material. Unfortunately, further heating of an LDH to greater than 800° C. may result in the formation of a thermodynamically stable and irreversible spinel phase accompanied by phase segregation and sintering.

SUMMARY

Accordingly, there is a continual need for mixed-metal oxide materials with better thermal stability, improved ability for catalyst regeneration, and improved resistance to sintering at higher temperatures, where particles irreversibly fuse together. Specifically, there is a need for mixed-metal oxide materials, which resist the irreversible formation of spinel phases when the mixed-metal oxide particles are subjected to higher temperatures.

Embodiments of the present disclosure are directed to metal oxides that are sinter free and reusable at high temperatures. Specifically, embodiments are directed to sintered free mixed-metal oxides from LDHs, which are recyclable by using adamantane as the guest anion. The anion confers a secondary advantage in preparing crystals with a larger aspect ratio than normally encountered in LDH crystal chemistry.

According to one embodiment, a method for preparing mixed-metal oxide particles is provided. The method comprises heating adamantane-intercalated layered double-hydroxide (LDH) particles up to a reaction temperature of from 400° C. to 800° C. to form mixed-metal oxide particles, where the adamantane-intercalated LDH particles have a general formula $[M_{1-x}Al_x(OH)_2](A)_x \cdot mH_2O$, where x is from 0.14 to 0.33, m is from 0.33 to 0.50, M is chosen from Mg, Ca, Co, Ni, Cu, or Zn, and A is adamantane carboxylate. The adamantane-intercalated LDH particles have an aspect ratio greater than 100, where the aspect ratio is defined as the width of an adamantane-intercalated LDH particle divided by the thickness of the adamantane-intercalated LDH particle. The mixed-metal oxide particles comprise a mixed-metal oxide phase containing M, Al or Fe and carbon.

Another embodiment is directed to mixed-metal oxide particles. The mixed-metal oxide particles comprise at least one mixed-metal oxide phase containing M, Al or Fe, and carbon, where M is chosen from Mg, Ca, Co, Ni, Cu, or Zn. The oxide phase has a formula MO, and the mixed-metal oxide phase may be sandwiched between chains of the oxide phase. The mixed-metal oxide particles comprise less than 5 wt %, by total weight of the mixed-metal oxide particles, spinel-phase having a formula $MAl_2O_4$ or $MFe_2O_4$. In further embodiments, the mixed-metal oxide particles do not include any spinel-phase having a formula $MAl_2O_4$ or $MFe_2O_4$.

According to another embodiment, a method of removing constituents from a process stream is provided. The method comprises contacting the process stream with a catalyst, where the catalyst comprises the mixed-metal oxide particles described previously.

Additional features and advantages of the embodiments described will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

(FIG. 9A) and after thermal decomposition at 800° C. (FIG. 9B) in accordance with one or more embodiments of the present disclosure;

DETAILED DESCRIPTION

The dispersion of active reduced metal or metal-oxide particles on a stable support is a complex and laborious process. To achieve this, one needs to consider various parameters such as the synthesis conditions, nature of the support and appropriate ways of dispersing/distributing active catalyst on the support. Ongoing goals for design and synthesis of catalytic systems in general include providing catalysts that are free from limitations such as uneven distribution, agglomeration of particles, sintering of active species at higher temperature, and ability to recycle precious metals.

Reference will now be made in detail to embodiments of mixed-metal oxide particles and specifically mixed-metal oxide particles produced from adamantane-intercalated layered double-hydroxide (LDH) particles.

Figure 6:
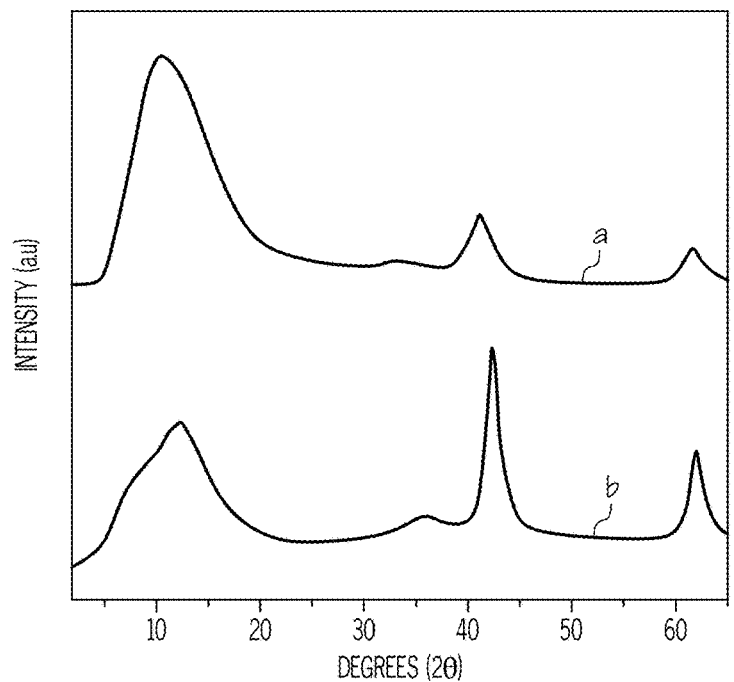
FIG. 6 is a PXRD graph of mixed-metal oxide residues after thermal decomposition at 400° C. (curve a) and after thermal decomposition at 800° C. (curve b) in accordance with one or more embodiments of the present disclosure.

The mixed-metal oxide particles may comprise at least one mixed-metal oxide phase containing M, Al or Fe, and carbon, where M is chosen from Mg, Ca, Co, Ni, Cu, or Zn. In a specific embodiment, the M is Mg. The mixed-metal oxide particles may also comprise an oxide phase having a formula MO. The mixed-metal oxide phase may be sandwiched between chains of the oxide phase. Additionally, the mixed-metal oxide particles comprise less than 5 weight percent (wt %), by total weight of the mixed-metal oxide particles, of spinel-phases having a formula $MAl_2O_4$ or $MFe_2O_4$. In various embodiments, the mixed-metal oxide particles comprise less than 3 wt. %, less than 2 wt. %, or less than 1 wt. %, by total weight of the mixed-metal oxide particles, of spinel-phases having a formula $MAl_2O_4$ or $MFe_2O_4$. The mixed-metal oxide particles may also comprise no spinel-phase having a formula $MAl_2O_4$ or $MFe_2O_4$. As shown in FIG. 6, the mixed-metal oxide particles may define a Powder X-Ray Diffraction (PXRD) profile having a signature peak at 13.0+/−0.5 at 800° C. Without being bound by theory, the mixed-metal oxide particles retain a layered metal oxide structure up to 800° C., and do not aggregate, even at up to 800° C. in the oxidizing atmosphere.

The method of producing the mixed-metal oxides comprises heating adamantane-intercalated layered double-hydroxide (LDH) particles from room temperature of approximately 25° C., such as 20° C. to 30° C., to a reaction temperature of 400° C. to 800° C. to form mixed-metal oxide particles. In a further embodiment, the reaction temperature may be from 500° C. to 700° C. Without wishing to be bound by theory, the heating rate of the adamantane-intercalated LDH particles is believed to be a factor in determining the nanocrystalline nature of the resultant oxide particles. For example, in one or more embodiments, the heating may occur at a heating rate of about 5° C./min, such as 4 to 6° C./min. It is contemplated that the heating step may be conducted at the reaction temperature for at least 4 hours.

Amorphous mixed-metal oxides are typically basic in nature and the basicity of the mixed-metal oxides can be tuned by varying the layer composition and nature of the anion in the LDH precursor. Additionally, many mixed-metal oxide materials have the ability to be regenerated back to the parent LDH material. For example, by treating many mixed-metal oxide materials with an aqueous solution of an anion such as the anion that was present in the parent LDH material, the mixed-metal oxide phase may transform back to the parent LDH in a process known as "reconstruction" or the "memory effect". Certain mixed-metal oxide materials characterized by a strong memory effect may be particularly desirable for catalyst applications, because such mixed-metal oxide materials are amenable to catalyst recycling processes. However, the memory effect of mixed-metal oxide materials may be limited by the formation of irreversible spinel phases at high temperatures, for example, 800° C. or greater. When irreversible spinel phases form, solution treatments of the mixed-metal oxide material become incapable of reconstructing the LDH material, because the atoms in the stable spinel phase no longer rearrange back to the layered structure of the LDH.

The adamantane-intercalated LDH particles may have a general formula $[M_{1-x}Al_x(OH)_2](A)_x \cdot mH_2O$, where x is from 0.14 to 0.33, m is from 0.33 to 0.50, M is chosen from Mg, Ca, Co, Ni, Cu, or Zn, and A is adamantane carboxylate. The adamantane-intercalated LDH particles have an aspect ratio greater than 100. As defined, the aspect ratio is the width of the LDH particle divided by the thickness of the LDH particle. As defined, an aspect ratio less than 10 is considered low, an aspect ratio less than 100 is considered medium, and an aspect ratio of 100 or greater is considered a high aspect ratio. The LDH particles may be calculated from the SEM images. For example, referring to the embodiment of FIG. 2B, it is clear that the layered particles have a large surface area, but lack thickness, which results in a high aspect ratio. Similarly, atomic force microscopy (AFM) may be utilized to measure the layered particles and calculate the aspect ratio.

Methods for preparing adamantane-intercalated LDH particles may include the step of adding to an aqueous solution a first precursor and a second precursor to form an initial solution. In one embodiment, the aqueous solution may consist essentially of water. The first precursor may comprise $Al(OH)_3$ or $Al_2O_3$. The second precursor may include a metal containing compound, for example, a hydroxide $M(OH)_2$ or an oxide MO, where M is a metal of oxidation state of +2. While various other metals are also contemplated, the M may be chosen from Mg, Ca, Co, Ni, Cu, Zn, or combinations thereof. In one or more embodiments, the second precursor may include $Mg(OH)_2$, $Ca(OH)_2$, $Co(OH)_2$, $Ni(OH)_2$, $Cu(OH)_2$, $Zn(OH)_2$, or combinations thereof. In further embodiments, the second precursor is $Mg(OH)_2$ or MgO. In one example, the second precursor is $Mg(OH)_2$ and the first precursor is $Al(OH)_3$.

Moreover, in further embodiments, the initial solution may have an M/Al molar ratio of 1 to 5, or 1 to 3. Furthermore, the initial solution may have a solid loading of less than 10 weight % solids, based on a total weight of the initial solution, or a solids loading or less than 5 weight % solids.

Subsequently, the method includes adding to the initial solution an amount of adamantane to form a reaction mixture having an Al/adamantane molar ratio of 0.5 to 2. In one or more additional embodiments, the Al/adamantane molar ratio may be from 0.8 to 1.2, or may be 1 to 1. Various adamantane sources are contemplated. In one embodiment, the adamantane may be added in the form of a carboxylic acid. Optionally, the reaction may be stirred.

Generally, LDHs for conversion to mixed-metal oxides are prepared with inorganic guest anions, which may be easily removed under thermal treatment. When using an organic anion, such as carboxylic acid functionalized adamantane, improved properties for LDHs may be achieved. Adamantane has a structure characterized by high symmetry ($T_d$), is free from intra-molecular strain and, as a result, it is extremely thermodynamically stable. At the same time, adamantane can be chemically functionalized. Adamantane has a melting point of 270° C. and it slowly sublimes even at room temperature. Adamantane is poorly soluble in water, but readily soluble in hydrocarbons.

Without being bound by theory, the use of thermally stable adamantane is a structure directing agent which allows for preferential growth of the LDH in the a and b crystallographic directions over the c crystallographic axes. This results in the high aspect ratio particles observed. Moreover, the use of hydrothermal synthesis and metal hydroxide precursors carefully controls the growth conditions in terms of pH and kinetics.

The adamantane carboxylate ions, which are intercalated between the metal hydroxide layers, may act as thermally stable templates for growing nano-MgO chains and also act as a barrier against the formation of a spinel phase. The resulting MgO chains have grain boundaries, which may show greater catalytic activity and higher thermal stability than conventional MgO or LDHs. Moreover, the thermal stability of the adamantane acid means that it does not decompose simultaneously to the layers, resulting in the interlayer and charge-balancing being retained. This appears to hinder the conversion process of the mixed-metal oxide to spinel phases, and as a result demonstrates a layered structure at higher temperatures.

As stated previously, the mixed-metal oxide particles are effective when utilized in a catalyst. Specifically, this catalyst comprising mixed-metal oxide particles may be used to remove carbon dioxide from a gas stream. Further, this catalyst comprising mixed-metal oxide particles may be used as a sorbent to remove toxic ions from a process stream. For example, removal of phosphates, arsenates, chromates, bromides, iodides, and sulfides from a gas stream or a water stream. Additionally, an adamantane-intercalated layered LDH precursor may be regenerated from the mixed-metal oxides. In one example, mixed-metal oxides obtained after decomposition at 800° C. were subjected to reconstruction by using sodium carbonate solution in an amount sufficient to provide a 3 times molar excess of $CO_3^{2-}$.

Additionally, LDHs are environmentally benign and economically viable layered materials. Due to their readily varied composition, well-dispersed substitutions, and layered nature, these materials have previously found use in various applications. Thermal decomposition of LDHs will result in mixed-metal oxides, which are basic in nature. These oxides have use as heterogeneous catalysts in various catalyzed reactions, including the water gas shift reaction and photocatalytic applications. In addition, these oxides are suitable for capturing $CO_2$ from coal fired power plants, which emit large amounts of $CO_2$ into the environment. In one or more applications, mixed-metal oxide materials obtained from LDHs have been found to be suitable sorbents for capturing acidic $CO_2$ gas, and are capable of adsorbing toxic ions from industrial effluents and drinking water.

EXAMPLES

The described embodiments will be further clarified by the following examples.

Example 1

Preparation of Adamantane-Intercalated Layered Double Hydroxides

To prepare an adamantane-intercalated layered double hydroxide material according to an embodiment described previously, a 5% wt/wt solution of $Mg(OH)_2$ was prepared by dissolving 5 grams (g) of $Mg(OH)_2$ in 95 g of de-ionized water. To the resultant solution, 3.36 g of $Al(OH)_3$ was added in an amount sufficient to provide an Mg/Al molar ratio of 2. Then, 9.31 g of adamantane carboxylic acid was added to the solution in an amount sufficient to provide an Al/adamantane molar ratio of 1:1 in the resultant reaction mixture. The pH of the reaction mixture was measured and was found to be 9.5.

The reaction mixture was then stirred vigorously for 1 hour at room temperature. The stirred reaction mixture was transferred to a Teflon-lined autoclave and was heated at 150° C. for 24 hours (h). A layered double hydroxide material was filtered from the mixture. The pH of the filtrate was measured and was found to be 8.6. In another set of experiments, the previously discussed procedure was repeated by using an Mg/Al molar ratio of 5. After the reaction was over, the products were washed thoroughly with water and dried at 65° C.

Figure 1:
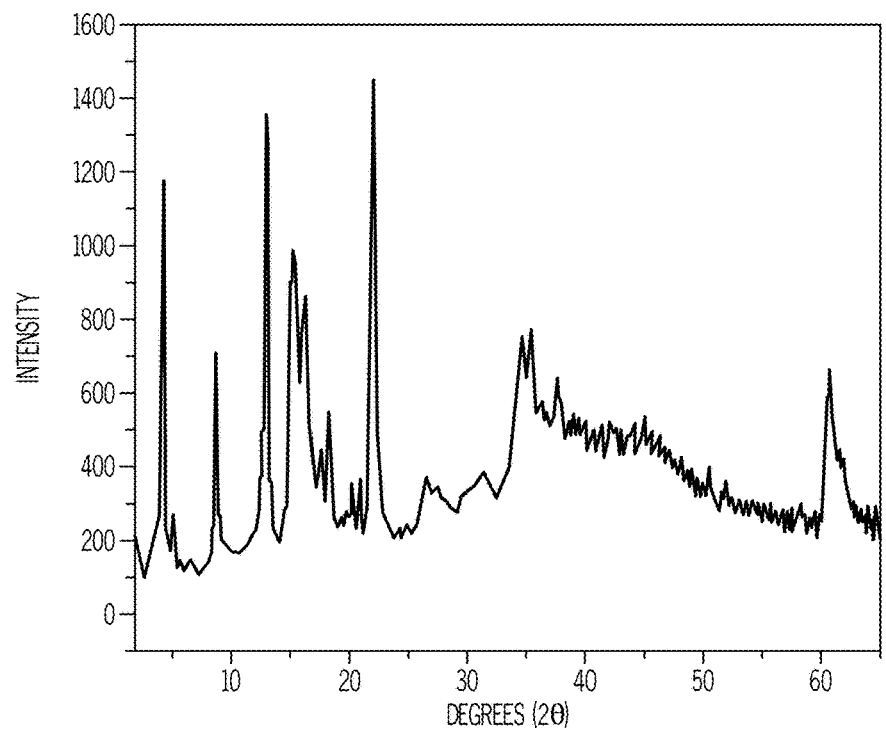
FIG. 1 is a Powder X-Ray Diffraction (PXRD) graph of a Mg/Al-adamantoate LDH in accordance with one or more embodiments of the present disclosure.
Figure 2:
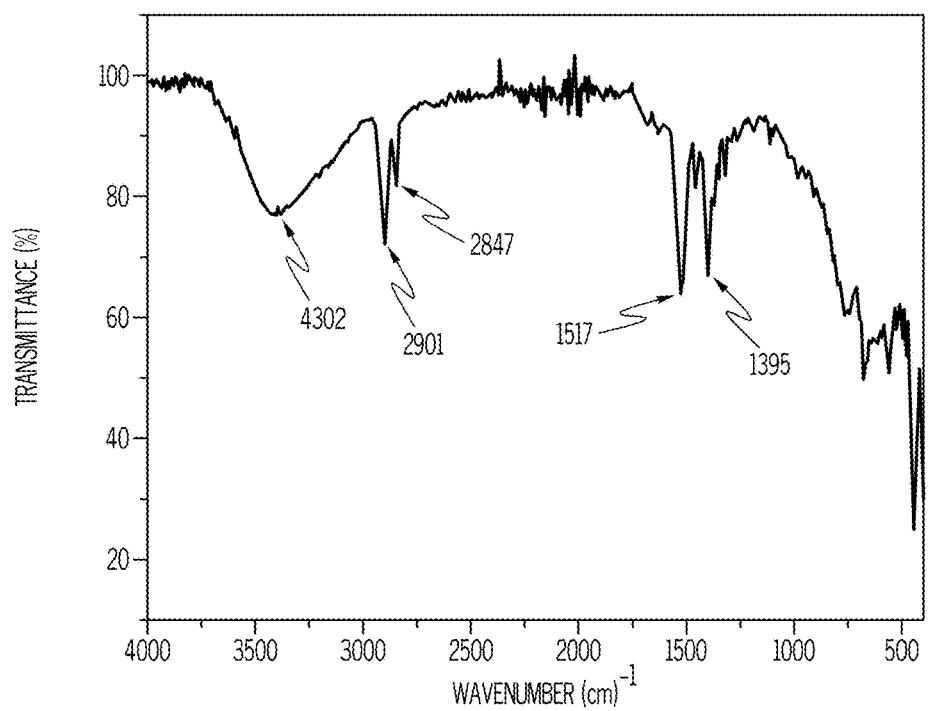
FIG. 2 is an Infrared (IR) Spectroscopy graph of a Mg/Al-adamantoate LDH in accordance with one or more embodiments of the present disclosure.

The PXRD pattern of the as-synthesized LDH is given in FIG. 1, and shows that the basal reflection (001) at 20.84 Å corresponds to a bilayer arrangement of adamantane ions in the interlayer. The submultiples of (001) are seen at higher 2θ values. Referring to FIG. 2, intercalation of adamantoic acid was further characterized with IR spectra. The vibrations at 1517 $cm^{-1}$ and 1395 $cm^{-1}$ correspond to antisymmetric and symmetric stretching vibrations of the $COO^-$ group. The vibrations at 2901 $cm^{-1}$ and 2847 $cm^{-1}$ are for the C—H vibrations. The 4302 $cm^{-1}$ vibration is due to hydrogen bonding of layer metal hydroxide groups with intercalated water molecules in the interlayer.

Figure 3:
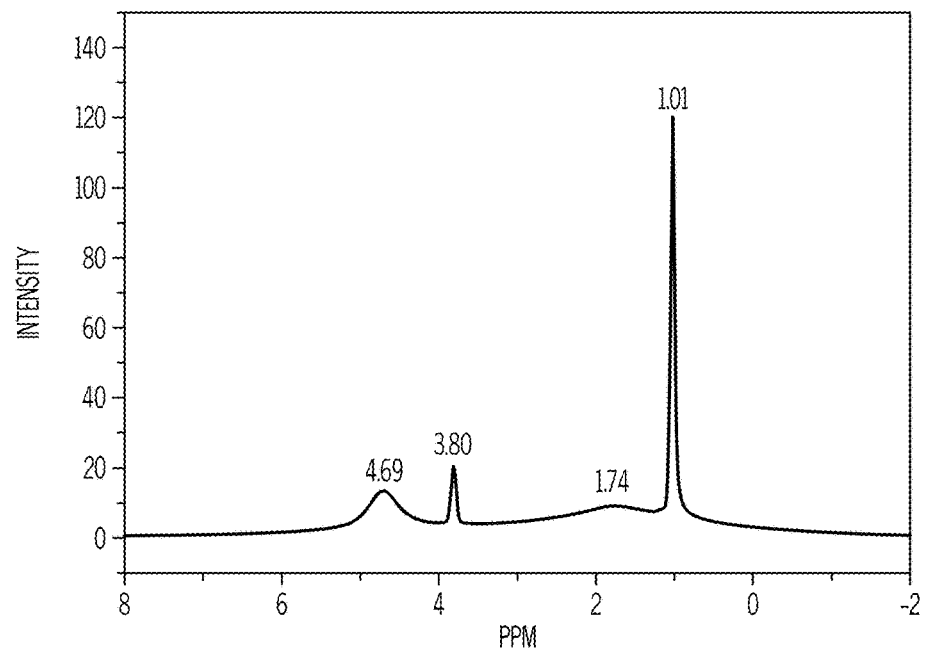
FIG. 3 is a graph of the $^1H$ solid-state Nuclear Magnetic Resonance (NMR) spectra of a Mg/Al-adamantoate LDH in accordance with one or more embodiments of the present disclosure.
Figure 4:
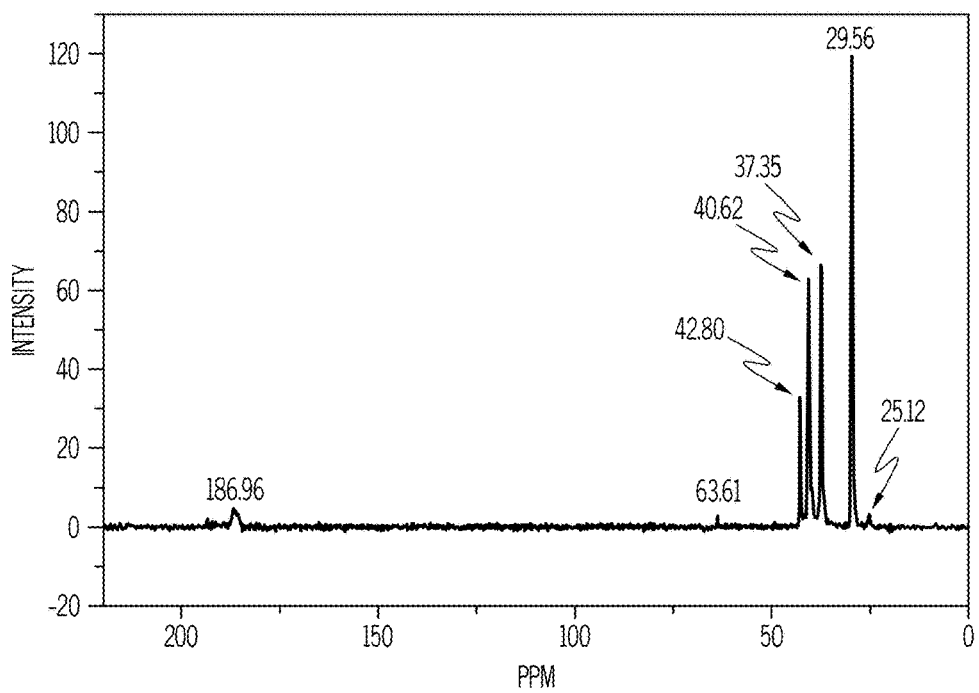
FIG. 4 is a graph of the $^{13}C$ solid-state NMR spectra of a Mg/Al-adamantoate LDH in accordance with one or more embodiments of the present disclosure.
Figure 5B:
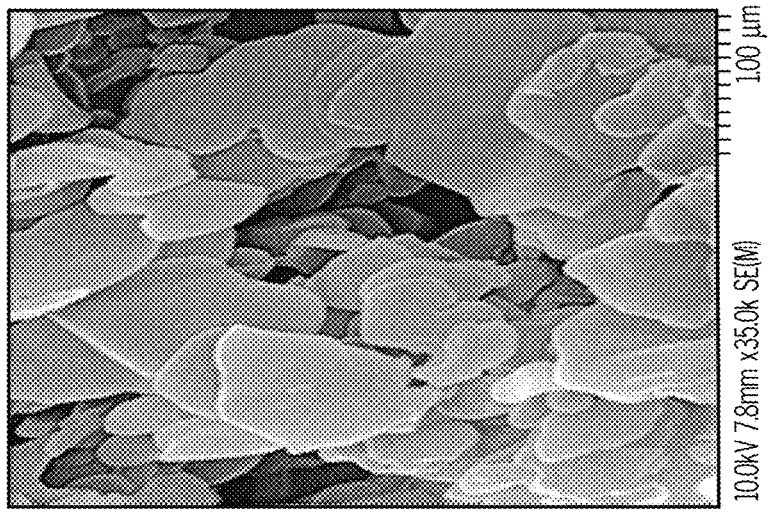
FIGS. 5A and 5B are Scanning Electron Microscopy (SEM) images of different magnifications of an Mg/Al-adamantoate LDH produced in accordance with one or more embodiments of the present disclosure.
Figure 5A:
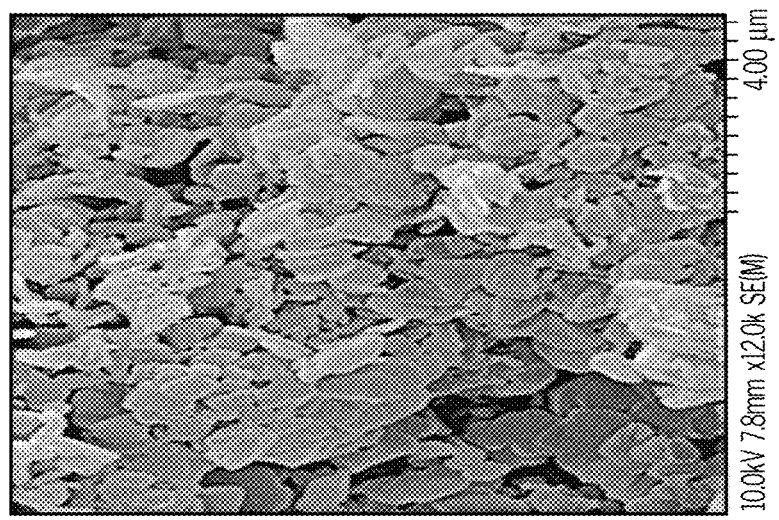

The $^1H$ and $^{13}C$ solid-state NMR spectra of Mg/Al-adamantoate LDH were recorded and are given in FIGS. 3 and 4, respectively. The 4 sharp peaks in the $^1H$ spectra of FIG. 3 at lower ppm values are due to the hydrogens present in the adamantane ring. The peak at 3.8 ppm and 4.8 ppm are due to hydrogens of the intercalated water and metal hydroxide respectively. Referring to FIG. 4, the $^{13}C$ NMR spectra of Mg/Al-adamantoate shows 4 peaks at 29.5 ppm, 37.3 ppm, 40.6 ppm and 42.8 ppm are due to 4 different carbons present in the adamantane molecule. The peak at 186.98 ppm is due to the carbon of the carboxylate group. Referring to FIGS. 5A and 5B, SEM images of the as-synthesized LDH show platelet morphology typical of layered materials.

Example 2

Preparation of Mixed-Metal Oxide Material

Mixed-metal oxides were obtained by heating the Example 1 samples from room temperature up to a maximum of 800° C. in an air atmosphere for 4 h with a 5° C./min heating rate. In another set of experiments, mixed-metal oxides were obtained from heating the Example 1 samples from room temperature to 400° C. in air atmosphere for 4 h with a heating rate of 5° C./min. Mixed-metal oxides obtained after decomposition at 800° C. were subjected to reconstruction by using sodium carbonate solution in an amount sufficient to provide a 3 times molar excess of $CO_3^{2-}$.

The prepared Mg/Al-adamantoate LDH was thermally decomposed at 400° C. and 800° C. for 4 h under an air atmosphere. Upon thermal decomposition, LDHs yield mixed-metal oxides, which are basic in nature. In the case of Mg/Al-adamantoate LDH, MgO and $MgAl_2O_4$ oxides are expected.

PXRD patterns of both the decomposed oxides show reflections due to MgO at 43° 2θ and 61° 2θ (FIG. 6). The broad reflection around 13° 2θ is surprising and unexpected for oxides based on LDHs as the layered structure is always lost upon thermal treatment at greater than 400° C. As demonstrated further by IR analysis, the reflection is due to the formation of a layered oxide type of layered material.

Figure 7:
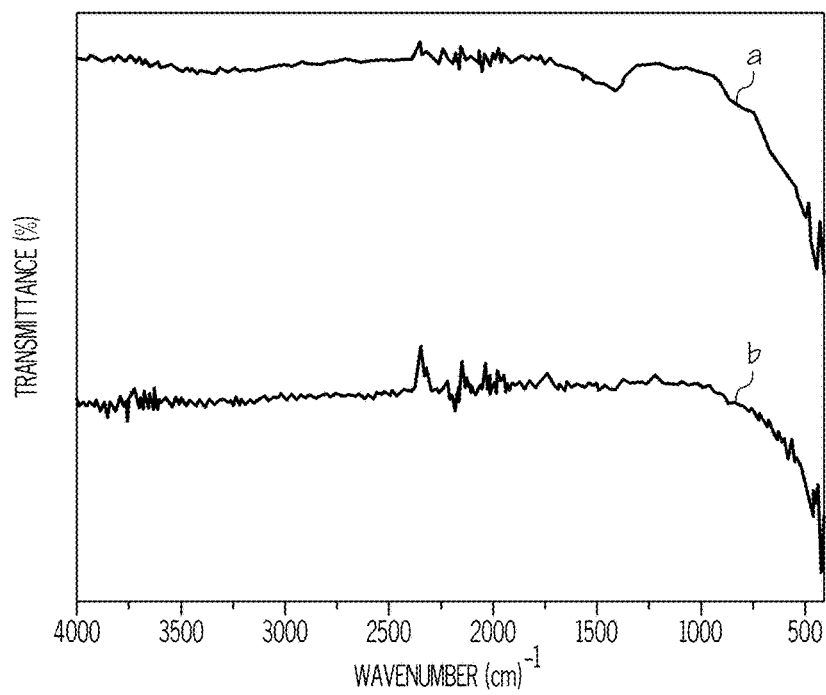
FIG. 7 is an IR spectroscopy graph of mixed-metal oxide residues after thermal decomposition at 400° C. (curve a) and after thermal decomposition at 800° C. (curve b) in accordance with one or more embodiments of the present disclosure.

Here, the IR spectra of the decomposed samples were recorded and are shown in FIG. 7. The IR spectra of the 800° C. sample shown in curve (b) did not show any peaks that could be correlated with the LDH starting material, thus indicating that the LDH phase is not present. The IR spectra of 400° C. shows a peak at 1405 $cm^{-1}$, but it is not due to the LDH phase, as shown earlier. This peak is possibly due to the CH bending vibrations of the adamantoate ion.

Figure 8:
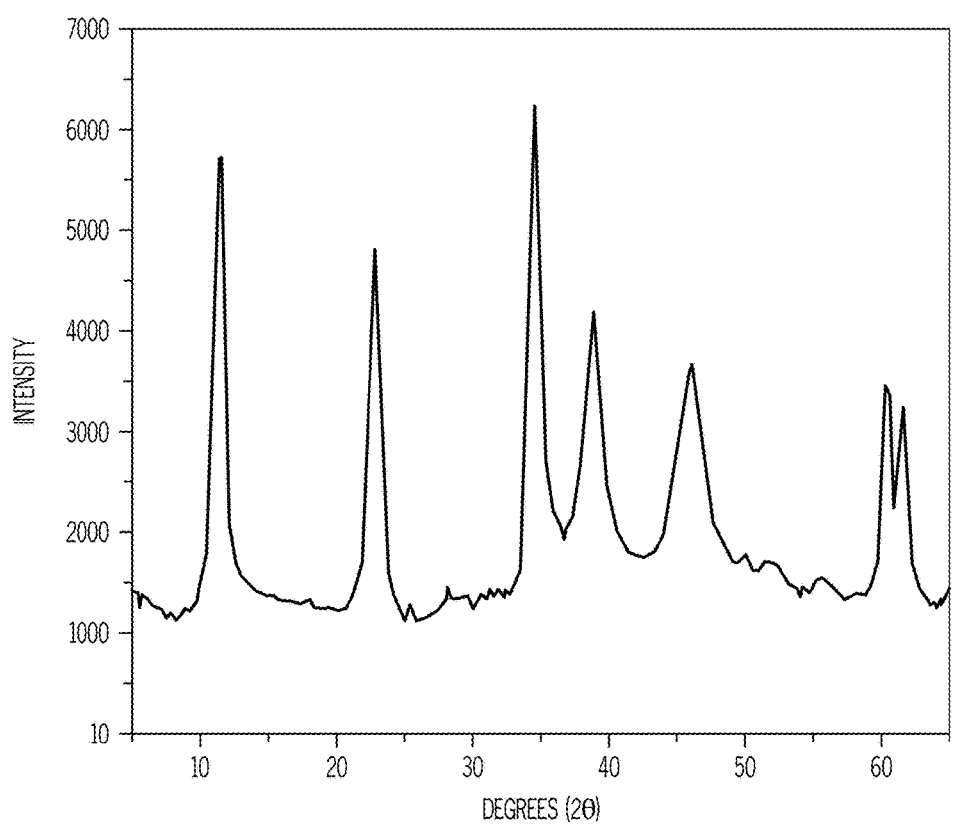
FIG. 8 is a PXRD graph of mixed-metal oxide residues of a Mg/Al-adamantoate LDH after reconstruction from an oxide residue heated to 800° C. in accordance with one or more embodiments of the present disclosure.

Surprisingly, the PXRD pattern of the decomposed oxide residue (at 800° C.) does not show reflections due to an $MgAl_2O_4$ or $MgFe_2O_4$ spinel phase. As shown in FIG. 8, this oxide residue upon treatment with aqueous solution of sodium carbonate gives the depicted carbonate intercalated LDH (See FIG. 8). PXRD is utilized to characterize the solids and any crystalline material present in the sample will show characteristic reflections in the PXRD pattern. Absence of the reflections due to $MgAl_2O_4$ or $MgFe_2O_4$ spinel in the PXRD pattern is taken as its absence in the sample. Moreover, spinel is a more thermodynamically stable phase than the hydroxide or LDH and hence will not revert back to the LDH phase. This further confirms the absence of the $MgAl_2O_4$ or $MgFe_2O_4$ spinel phase in the oxide residue, as the extremely stable post-segregation spinel would not reconstruct into the LDH.

In summary, the PXRD evidences that for the Mg/Al-adamantoate LDH precursor, a layered material still exists at 800° C., a temperature at which every LDH material previously reported, to our knowledge, has not only lost its layer structure but has also started to sinter and segregate into spinel phases. From IR spectroscopy, it is clear that the layered phase is not due to any residual LDH material, but due to another phase.

Figure 9A:
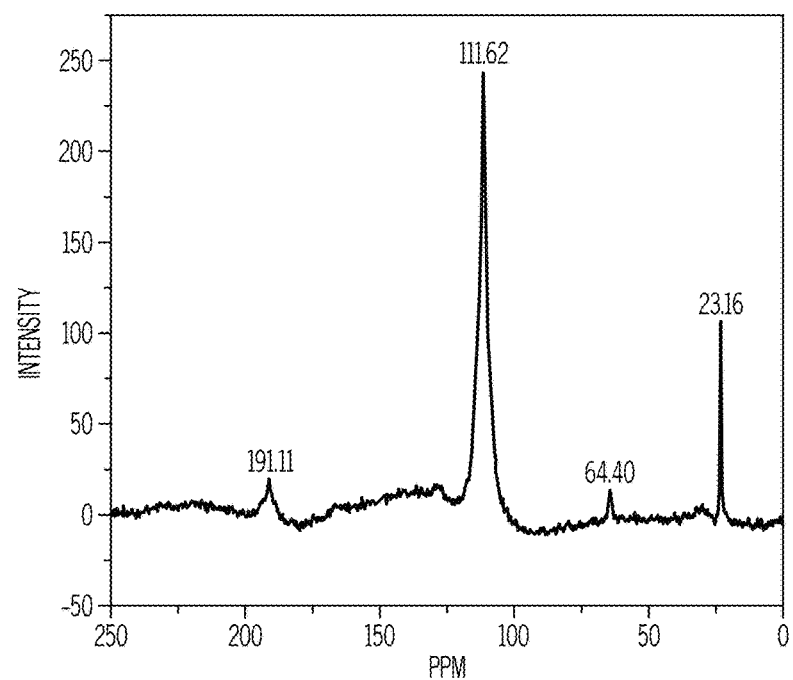
FIGS. 9A and 9B are graphs of the $^{13}C$ solid-state NMR spectra of mixed-metal oxide residues after thermal decomposition at 400° C.
Figure 9B:
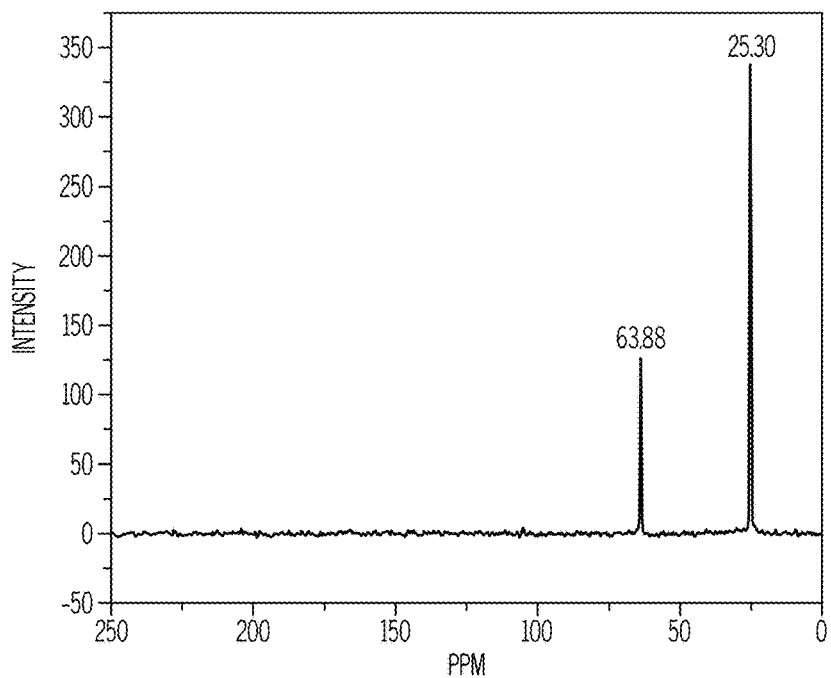

To check the possibility of the presence of an adamantane moiety, which has possibly played a crucial role in forming layered phase combining mixed-metal oxide and MgO, the resultant product was further characterized with $^{13}C$ solid-state NMR. The $^{13}C$ NMR spectra of both the 400° C. and 800° C. oxide residue are shown in FIGS. 9A and 9B, respectively. Referring to FIG. 9A, the oxide residue obtained at 400° C. shows two peaks at 25 ppm and 64 ppm, indicating the presence of two different kinds of carbon environment. The peaks at 110 ppm and 190 ppm are due to the Teflon capsule used for the measurement. Referring to FIG. 9B, the peaks at 25 ppm and 64 ppm were enhanced in intensity in the oxide residue obtained at 800° C. A peak at 25 ppm is characteristic of an $sp^3$ hybridized carbon and the peak at 64 ppm is characteristic of an sp hybridized carbon. Thus, these results clearly indicate the presence of two different kinds of carbon.

Figure 10A:
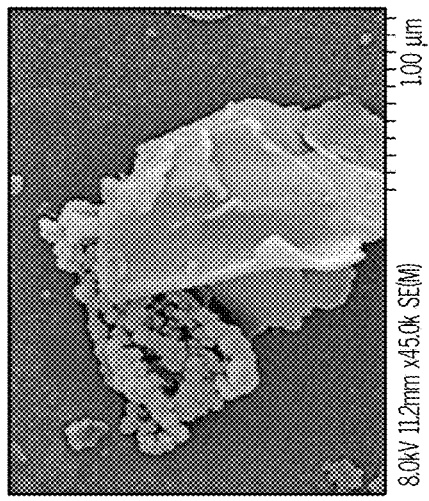
FIGS. 10A-10D are SEM images of different magnifications of mixed-metal oxide residues after thermal decomposition at 400° C. in accordance with one or more embodiments of the present disclosure.
Figure 10B:
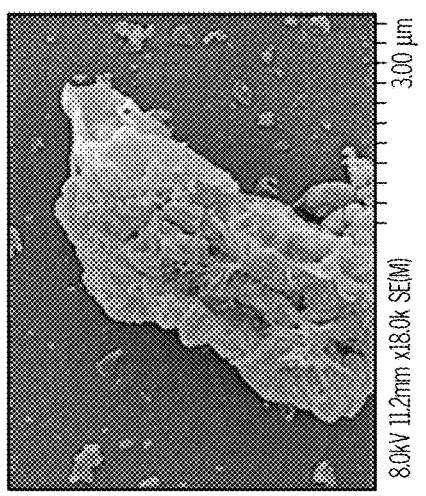
Figure 10C:
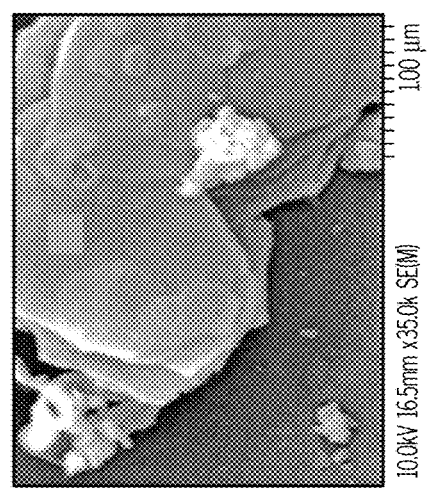
Figure 10D:
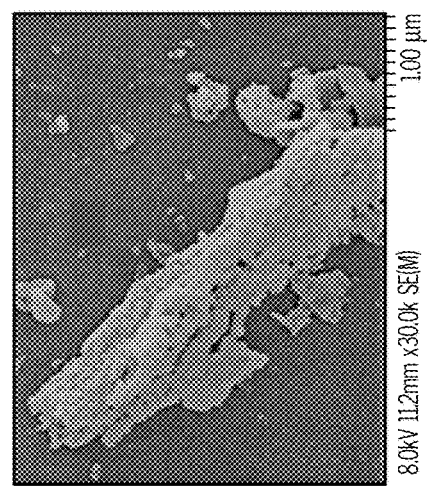
Figure 11B:
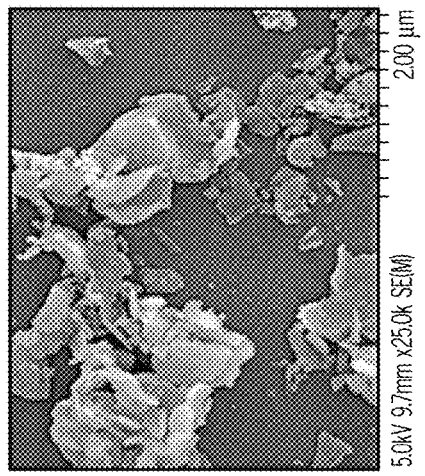
FIGS. 11A-12D are SEM images of different magnifications of mixed-metal oxide residues after thermal decomposition at 800° C. in accordance with one or more embodiments of the present disclosure.
Figure 11D:
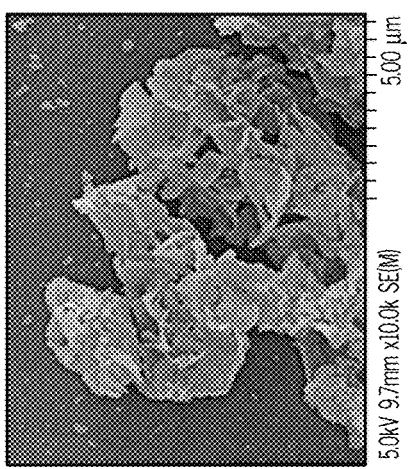
Figure 11A:
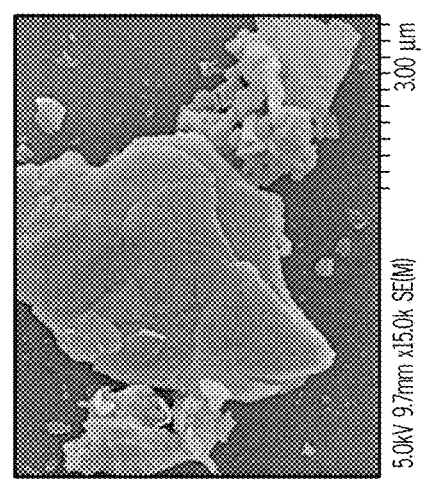
Figure 11C:
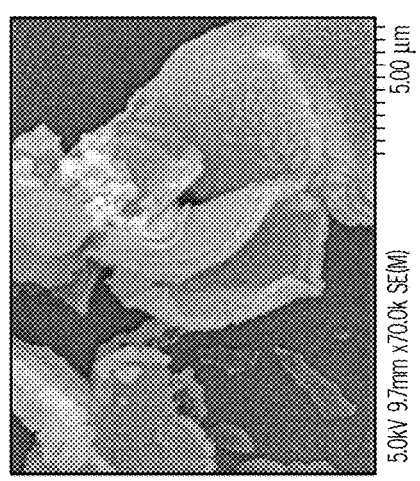
Figure 12A:
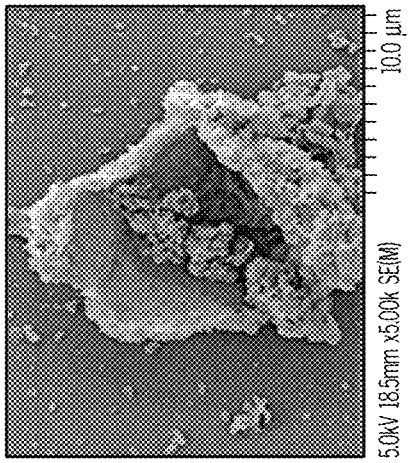
Figure 12B:
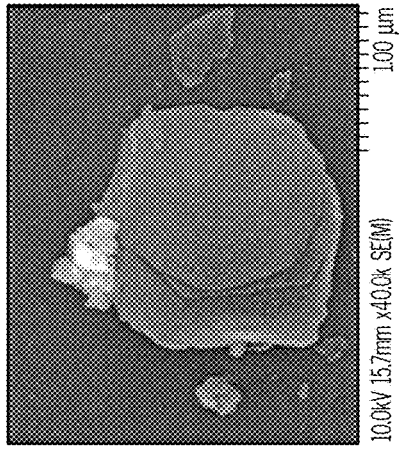
Figure 12C:
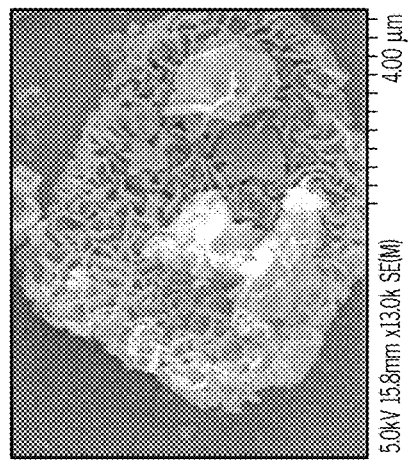
Figure 12D:
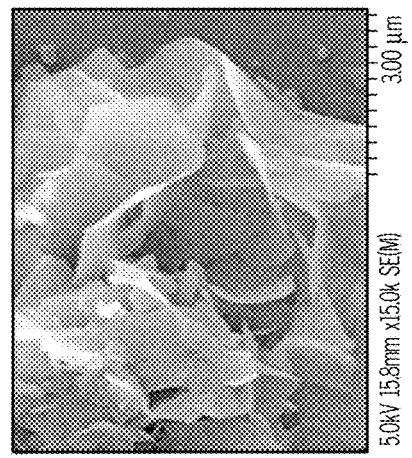

To see the possible growth of mixed-metal oxides along with MgO, SEM analysis of the oxide phases formed was undertaken. FIGS. 10A-10D show the SEM images of the oxide residue obtained at 400° C. The oxide residue is layered in structure as shown in FIGS. 10A and 10B. The growth of oxide chains along with the layers is depicted in FIG. 10C and the SEM of FIG. 10D demonstrates that adamantane is acting as a template or growth directing agent for the oxide residue. SEM images of the oxide residue obtained at 800° C. are provided in FIGS. 11A-12D.

Figure 13:
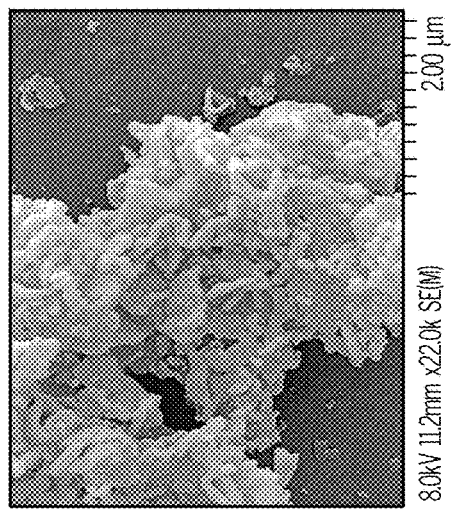
FIG. 13 is another SEM image of mixed-metal oxide residues after thermal decomposition at 400° C. in accordance with one or more embodiments of the present disclosure.

Referring to FIG. 13, the formation mechanism of high temperature layered oxides in the present case can be explained on the basis of SEM images of the mixed-metal oxide residue obtained from Mg/Al-adamantoate LDH decomposed at 400° C. for 4 h. The SEM depicts the MgO chains on the edges and as well as on the basal surface of the oxide residue. The adamantane moiety present in the interlayer of LDH is acting as a growth template for MgO chains, which in turn prevents the agglomeration of layers, thus leading to the suppression of spinel phase formation.

Figure 14B:
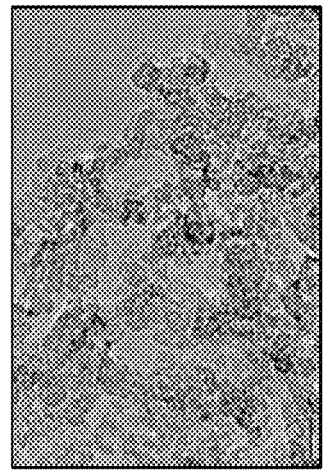
FIGS. 14B and 14C are High-Resolution Transmission Electron Microscopy (HRTEM) images of the mixed-metal oxide residues of FIG. 14A in accordance with one or more embodiments of the present disclosure.
Figure 14D:
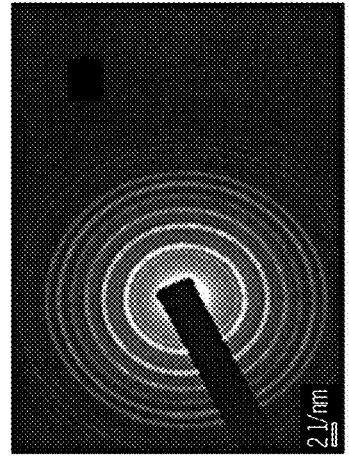
FIG. 14D is a TEM image of a Selected Area Diffraction Pattern (SADP) of the mixed-metal oxide residues of FIG. 14A in accordance with one or more embodiments of the present disclosure.
Figure 14A:
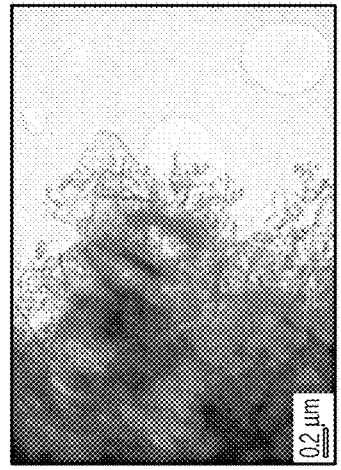
FIG. 14A is a Transmission Electron Microscopy (TEM) bright field image of mixed-metal oxide residues after thermal decomposition at 400° C. in accordance with one or more embodiments of the present disclosure.
Figure 14C:
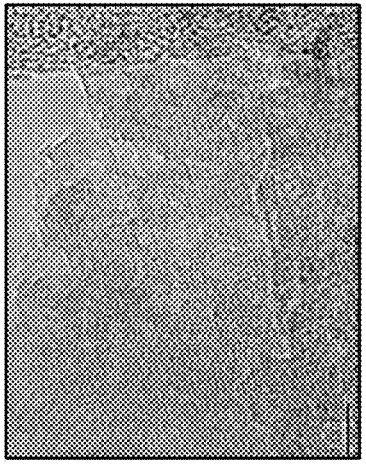
Figure 15B:
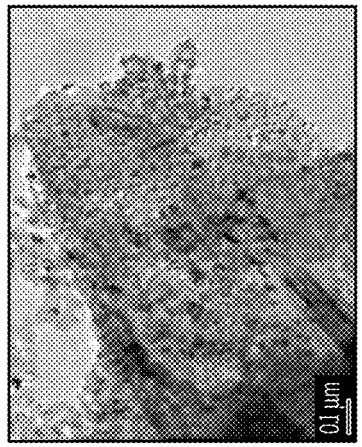
FIGS. 15A-15C are TEM bright field images of mixed-metal oxide residues after thermal decomposition at 800° C. in accordance with one or more embodiments of the present disclosure.
Figure 15D:
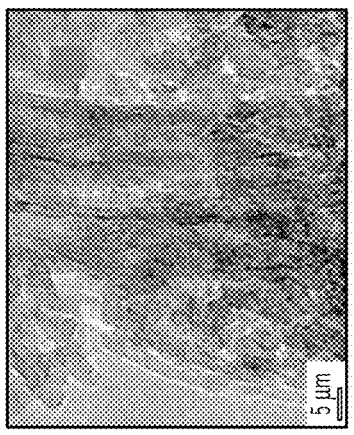
FIG. 15D is a HRTEM images of the mixed-metal oxide residues of FIG. 15C in accordance with one or more embodiments of the present disclosure.
Figure 15A:
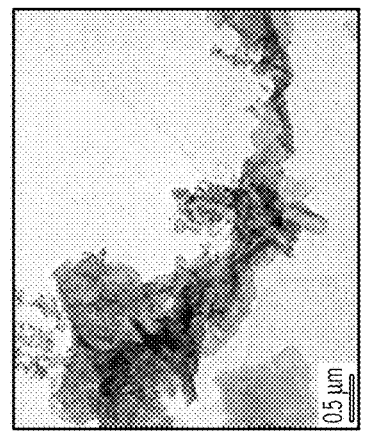
Figure 15C:
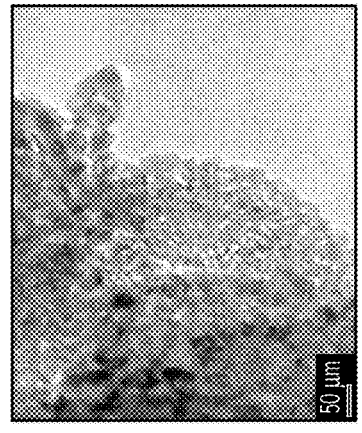

The oxide residue was further characterized by TEM, and HRTEM to analyze the layer-by-layer assembly of the mixed-metal oxides and MgO chains. FIGS. 14A and 14B show TEM images of the oxide residue obtained at 400° C. The HRTEM image of FIG. 14C and its selected area electron diffraction pattern of FIG. 14D further demonstrate the layering structure depicted in FIGS. 14C and 14D. Referring to the TEM images of FIGS. 15A-15C and the HRTEM image of FIG. 15D, the oxide residue at 800° C. maintains a similar layer structure to the layer structures depicted in FIGS. 14A-14D.

Figure 16B:
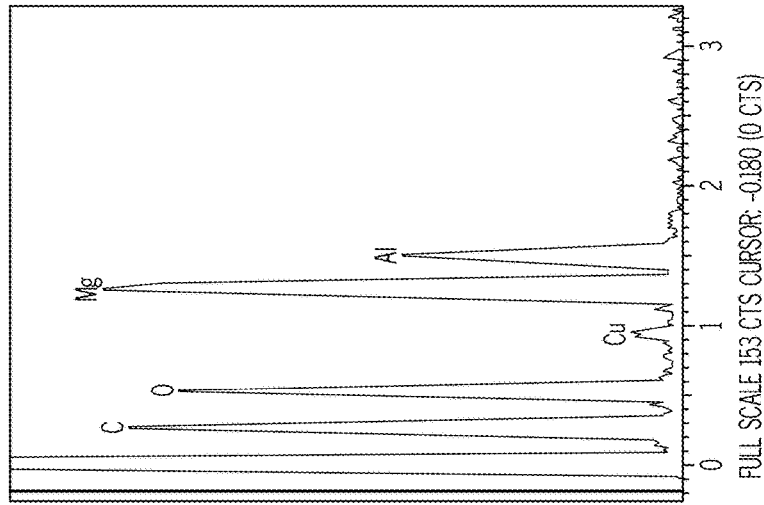
FIG. 16B is an EDX image of the layers of the mixed-metal oxide residues at a temperature of 800° C. in accordance with one or more embodiments of the present disclosure.
Figure 16A:
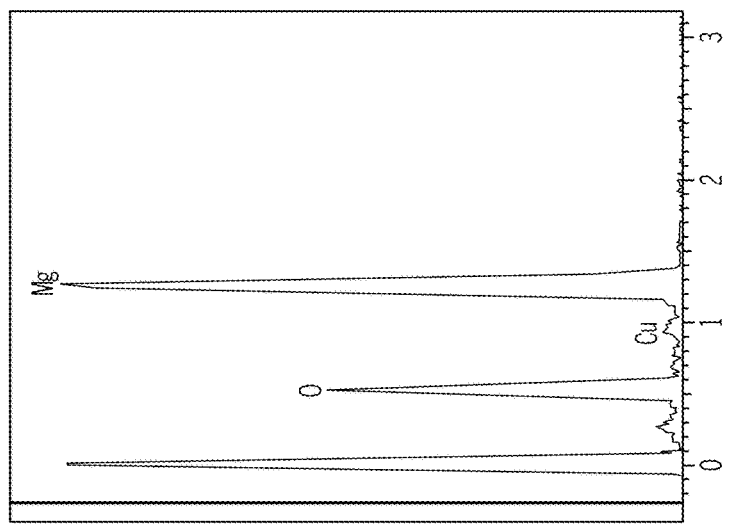
FIG. 16A is an Energy Dispersive X-ray (EDX) spectroscopy image of the MgO chains of the mixed-metal oxide residues at a temperature of 800° C. in accordance with one or more embodiments of the present disclosure.

In the present embodiments, carbon is present in sheet-like structures, even at 800° C., due to the polymerization of adamantane ions. To prove this point qualitatively, the EDX spectra of mixed-metal oxides is provided in FIG. 16B. FIG. 16A is an EDX spectra which isolates one of the chains from the 800° C. mixed-metal oxide samples. EDX spectra of the chain-like structures reveals the presence of Mg and O indicating it was made up from MgO, rather than carbon as anticipated. However, EDX spectra of the layered material surprisingly showed the presence of C, O, Mg, and Al indicating the presence of carbon in the oxide residue, even at 800° C.

Figure 17B:
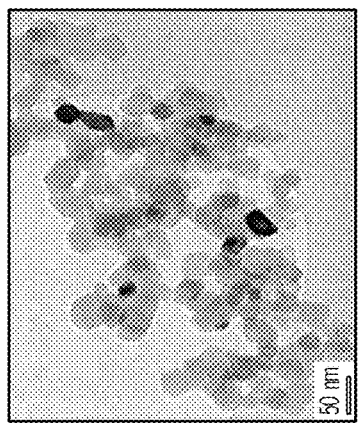
FIGS. 17A and 17B are TEM bright field images of MgO chains after thermal decomposition at 800° C. in accordance with one or more embodiments of the present disclosure.
Figure 17D:
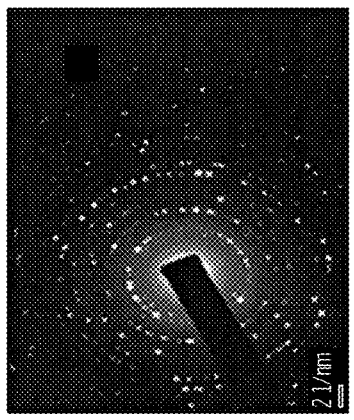
FIG. 17D is a TEM image of an SADP of the MgO chain of FIG. 17C in accordance with one or more embodiments of the present disclosure.
Figure 17A:
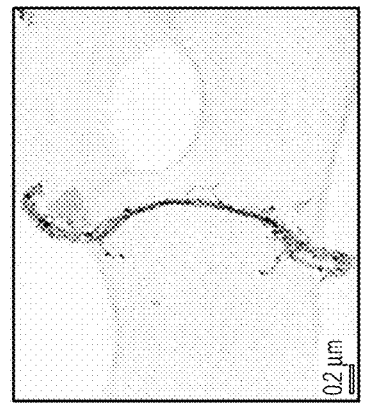
Figure 17C:
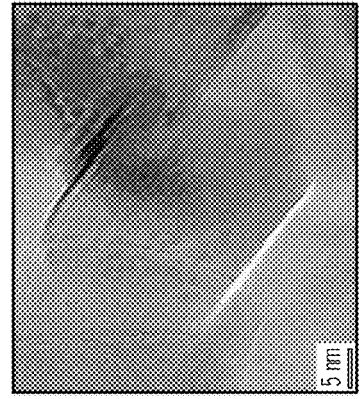
FIG. 17C is an HRTEM image of the MgO chain of FIG. 17B in accordance with one or more embodiments of the present disclosure.
Figure 18B:
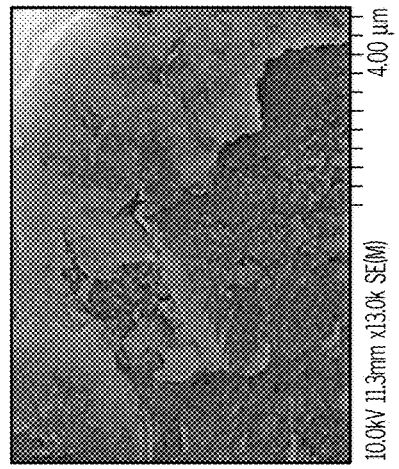
FIGS. 18A-18D are SEM images of different magnifications of mixed-metal oxide residues from Mg/Al—NO$_3$ after thermal decomposition at 400° C.
Figure 18D:
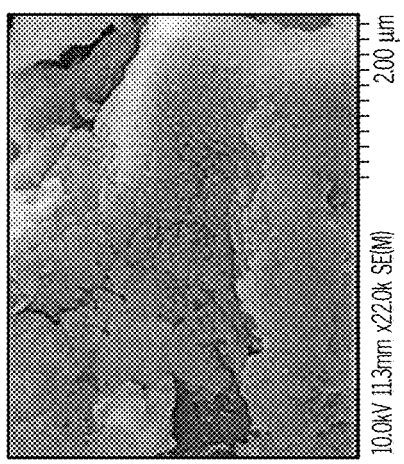
Figure 18A:
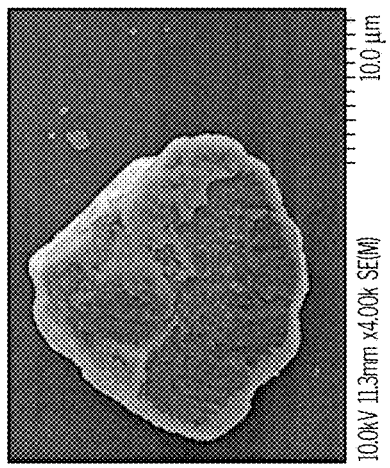
Figure 18C:
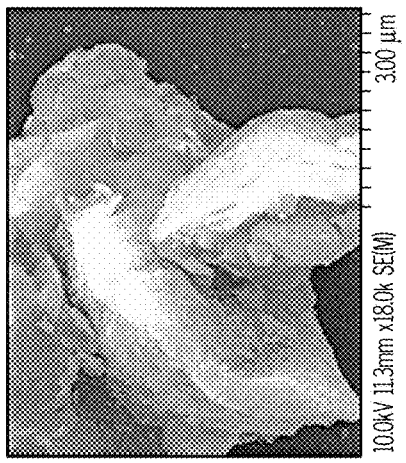
Figure 19:
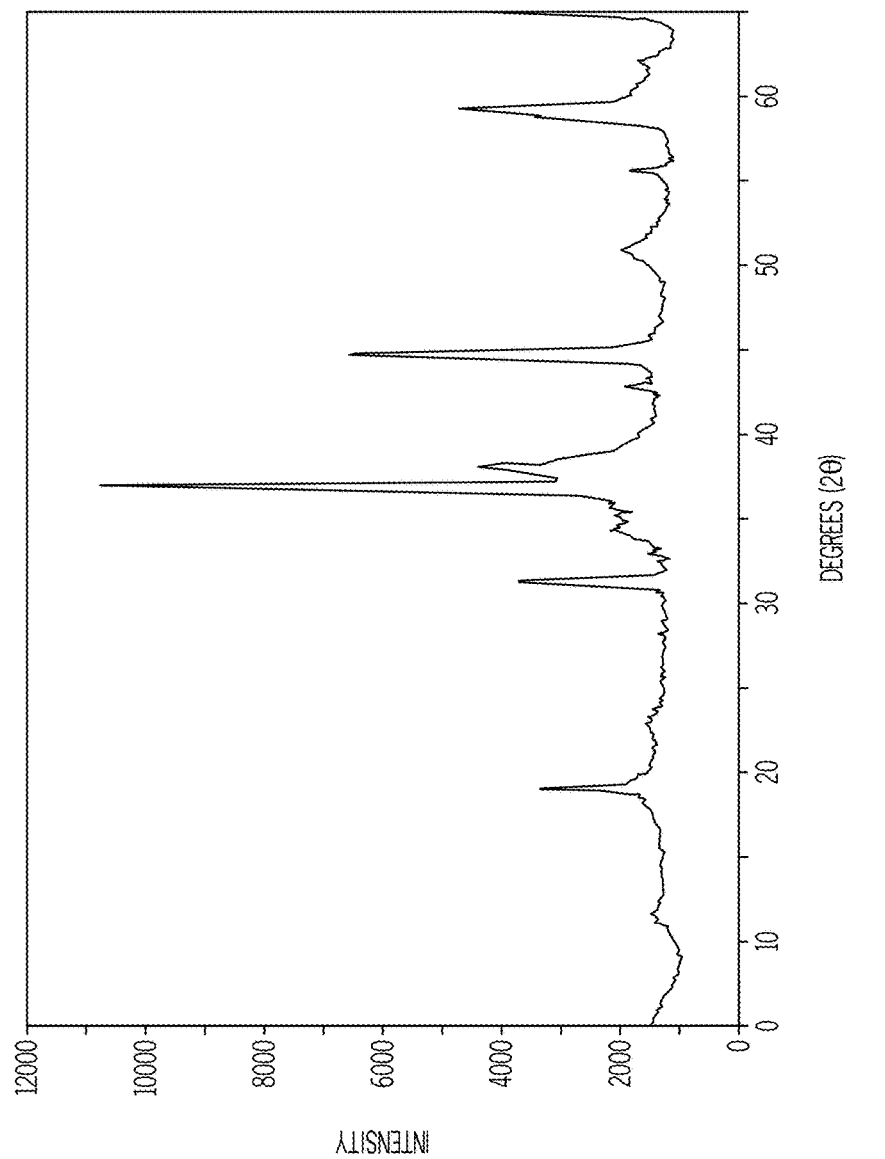
FIG. 19 is a PXRD graph of reconstructed oxide residues of a Mg/Al-adamantoate LDH after reconstruction from an oxide residue heated to 1100° C. in accordance with one or more embodiments of the present disclosure.

TEM, and HRTEM analysis and selected area diffraction patterns of the MgO chains is provided in FIGS. 17A-17D. The MgO oxide chains have grown by connecting one mixed-metal oxide particle with another, as shown in FIG. 17C. This kind of growth has resulted in the generation of grain boundaries between two oxide particles, which are expected to show high catalytic activity.

In order to probe the stability of the material at a raised temperature, surface characterization (using BET) of the oxide phase obtained from Mg/Al-adamantane LDH (400° C.) was undertaken; this showed a surface area of 200 m²/g with a type IV isotherm indicating that the formed oxide was mesoporous in nature.

Comparative Example

Mixed-Metal Oxides from Mg/Al—$NO_3$ Layered Double Hydroxide Formed by Ammonia Precipitation An Mg/Al—$NO_3$ (Mg/Al=2) layered double-hydroxide was synthesized by a conventional ammonia precipitation method starting from metal nitrates and thermally decomposed at 400° C. for 4 h. SEM images of the decomposed Mg/Al—$NO_3$ LDH are provided in FIGS. 18A-18D. These illustrate how, generally, upon decomposition, LDHs lose their layered structure to give amorphous oxides. As shown in the SEM micrographs, the layered structure has been lost and that the particles are starting to fuse together.

Comparative Example

Reconstruction of Mixed-Metal Oxides from Mg/Al—$NO_3$ Layered Double Hydroxide Formed by Ammonia Precipitation and Adamantane-Intercalated Layered Double Hydroxides Repeated reconstruction experiments using oxides generated from the LDH of the present disclosure were compared with the oxides obtained from the conventional LDHs. The LDH used for the reconstruction studies was Mg/Al—$CO_3$ (Mg/Al=2) and was prepared using a coprecipitation technique at pH 10. The mixed metal oxides were obtained by heating the oxides at 400, 800, and 1100° C. and then reconstructed back to LDHs using $Na_2CO_3$ solution. The PXRD patterns of the oxide formed from the coprecipitated LDH at 1100° C. shows the material was converted to a spinel phase, with very little reconstruction back to the parent LDH upon rehydration. During the mixed metal oxide formation the $Al^{3+}$ changes its coordination geometry from octahedral ($O_h$) to tetrahedral ($T_d$) coordination and reverts back to octahedral coordination upon reconstruction. The measurement of $Al^{3+}$ in these geometries at different steps (mixed metal oxide phase and reconstructed phase) provides a direct measure of the recyclability or phase segregation of these oxides. Using solid state NMR techniques, the amount of $Al^{3+}$ present in the $O_h$ and $T_d$ during oxide formation and reconstruction steps was quantified. Oxides were formed by heating the LDH of the present disclosure and conventional LDHs up to a desired temperature and back to room temperature. The $Al^{3+}$ will revert back to the $O_h$ coordination upon reconstruction and any $Al^{3+}$ left in the $T_d$ coordination is accounted for the phase segregated/non-recyclable phase. As illustrated in Tables 1 and 2, the oxides obtained from the LDH of the present disclosure exhibit better reconstruction than the oxide obtained from conventional mixed metal oxides. The first column (Oxide $T_d$ %) shows the tendency of Al in hydroxide to go to spinel phase. Whereas, the second column (Reconstruction $T_d$ %) shows the residual Al after reconstruction. Data from both the columns clearly shows that adamantane intercalated LDH has the ability to reduce migration of Al from hydroxide phase (to spinel) during thermal treatment and as well as has the ability to reconstruct back leaving a smaller amount of Al in spinel phase (segregated phase) compared to conventional LDH particles.

TABLE 1 adamantane-intercalated LDH particles

| Temperature Cycle | Oxide $T_d$ % | Reconstruction $T_d$ % |
|---|---|---|
| 400° C. (1 cycle) | 22.4 | — |
| 800° C. (1 cycle) | 27.2 | 4.4 |
| 800° C. (4 cycles) | 27.4 | 6.0 |
| 800° C. (8 cycles) | 24.9 | 8.3 |

TABLE 2 conventional LDH particles

| Temperature Cycle | Oxide $T_d$ % | Reconstruction $T_d$ % |
|---|---|---|
| 400° C. (1 cycle) | 40.6 | — |
| 800° C. (1 cycle) | 36.9 | 11.6 |
| 800° C. (4 cycles) | 26.0 | 13.2 |
| 800° C. (8 cycles) | 22.0 | 17.2 |

Figure 20:
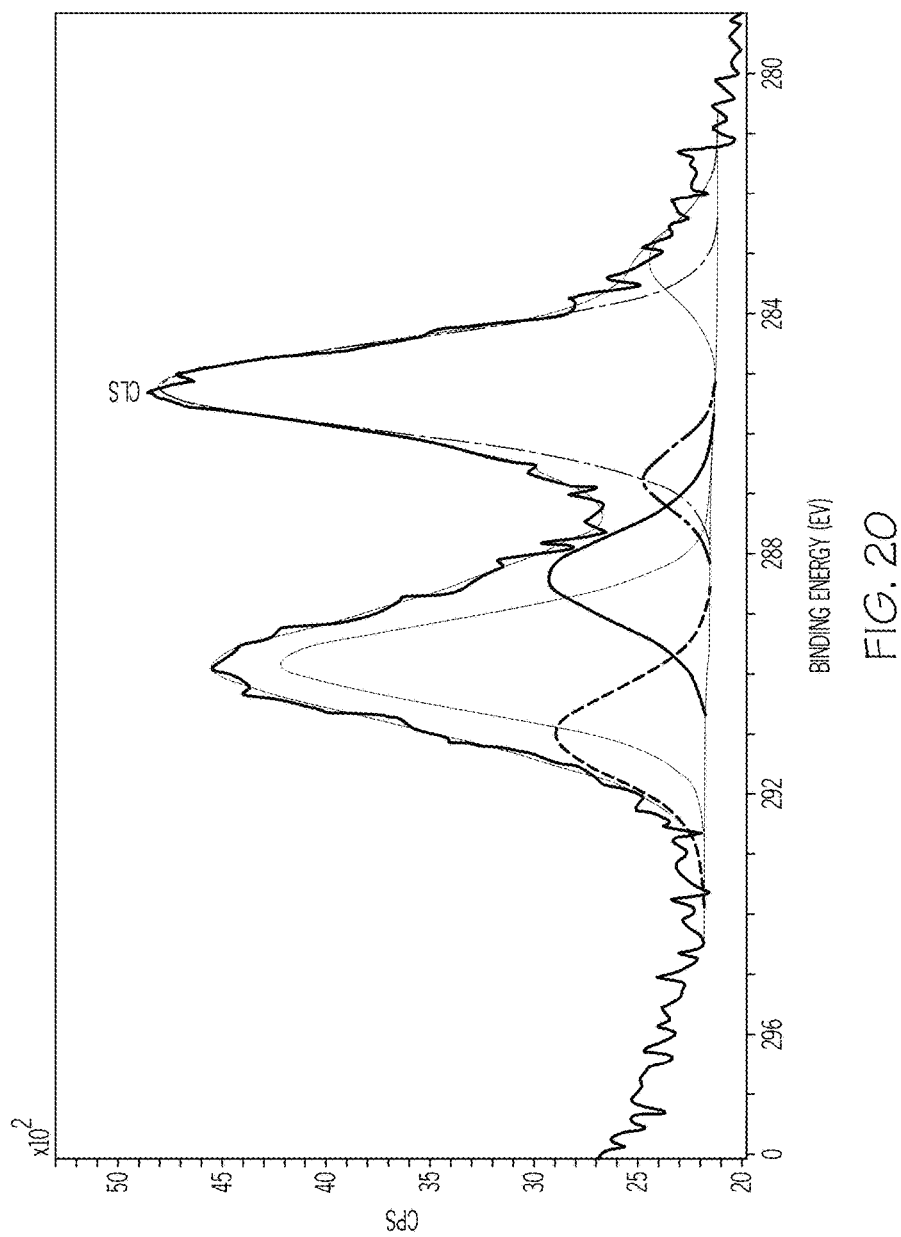
FIG. 20 is a X-ray photoelectron spectroscopy (XPS) graph of reconstructed oxide residues of a Mg/Al-adamantoate LDH after reconstruction from an oxide residue heated to 400° C. in accordance with one or more embodiments of the present disclosure.
Figure 21:
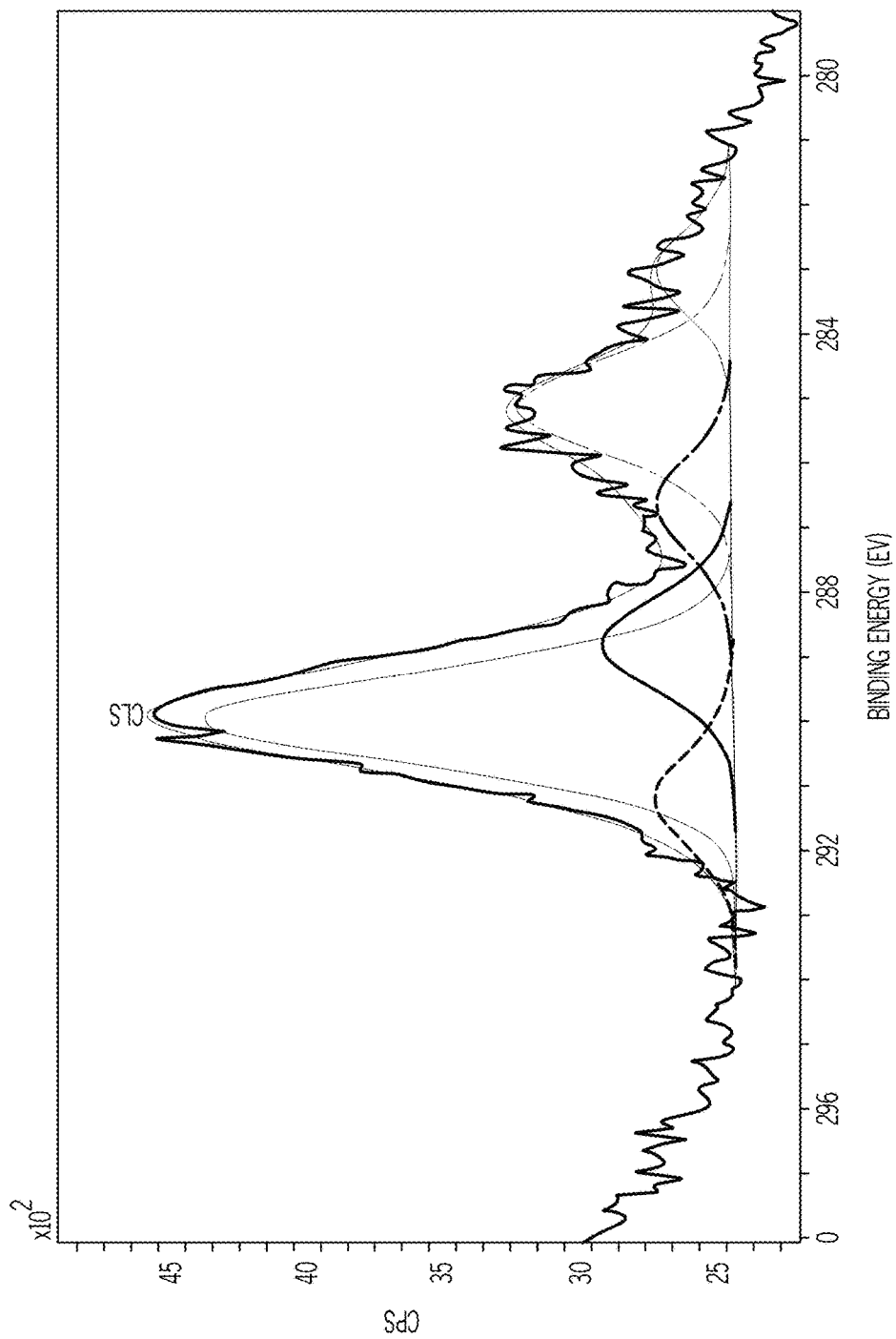
FIG. 21 is a X-ray photoelectron spectroscopy (XPS) graph of reconstructed oxide residues of a Mg/Al-adamantoate LDH after reconstruction from an oxide residue heated to 800° C. in accordance with one or more embodiments of the present disclosure.
Figure 22:
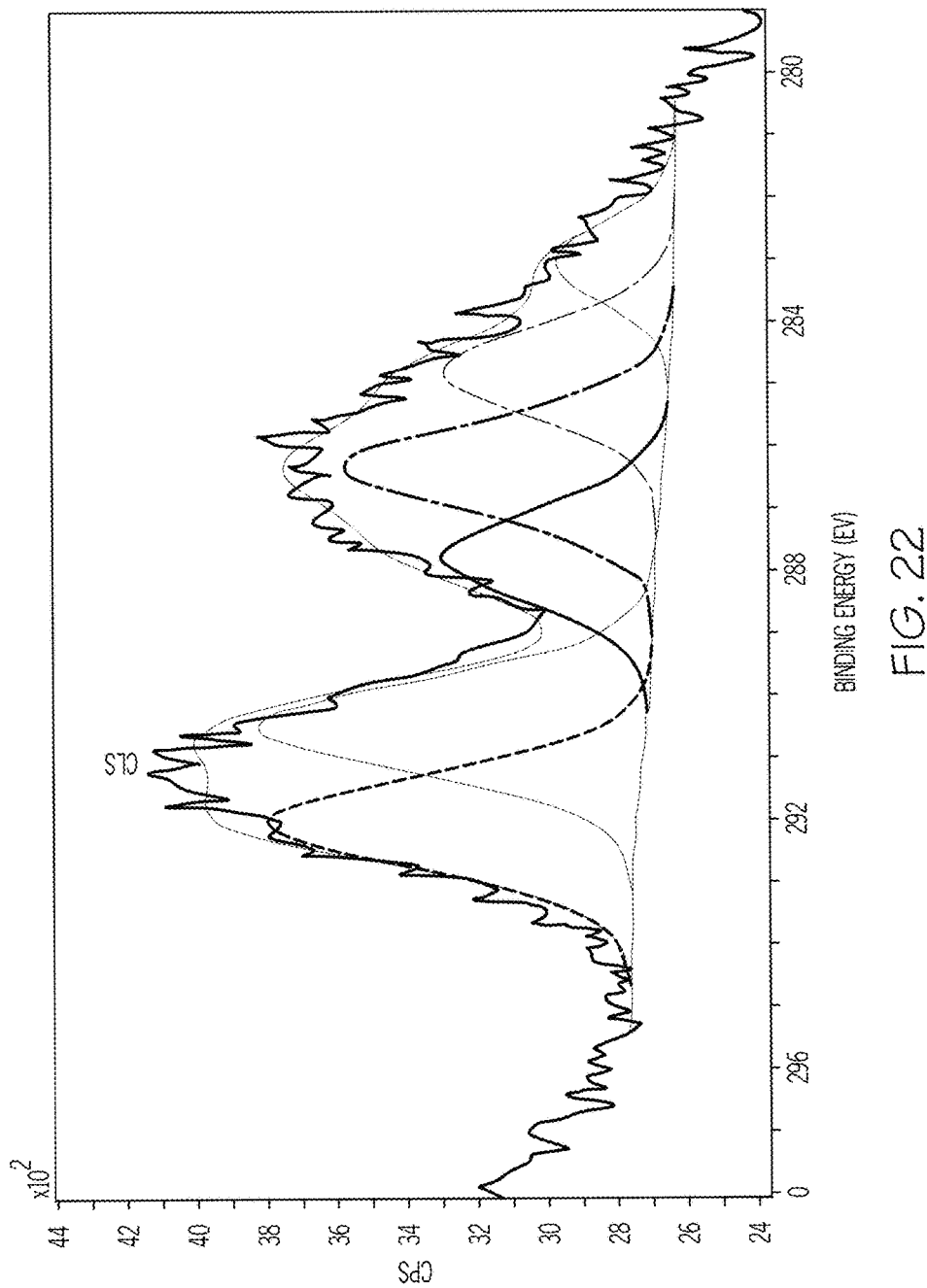
FIG. 22 is a X-ray photoelectron spectroscopy (XPS) graph of reconstructed oxide residues of a Mg/Al-adamantoate LDH after reconstruction from an oxide residue heated to 1100° C. in accordance with one or more embodiments of the present disclosure.

The presence and nature of the carbon support to the mixed metal oxides were further characterized by XPS spectra. The XPS spectra of the parent LDH shows a single peak with a binding energy centered around 285.3 eV. This peak has carbon components due to C—C and O—C═O bonds characteristic of adamantane carboxylate. The mixed metal oxides obtained by heating the sample at 400, 800 and 1100° C. (FIGS. 20, 21, and 22 respectively) shows the two binding energy peaks centered around 285 and 289.5 eV. The peak at 285 eV is similar to that observed in the parent LDH and is due to adamantane carboxylate. The peak at 289.5 eV is due to the carbon made of organic polymeric chains and in this case is due to adamantane chains. Based on the XPS spectra, it may be concluded that the mixed metal oxides are anchored on the long chains of nano diamondoids (adamantanes).

It should be apparent to those skilled in the art that various modifications and variations can be made to the described without departing from the spirit and scope of the claimed subject matter. Thus it is intended that the specification cover the modifications and variations of the various described embodiments provided such modification and variations come within the scope of the appended claims and their equivalents.

What is claimed is:

1. A method for preparing mixed-metal oxide particles comprising:
   heating adamantane-intercalated layered double-hydroxide (LDH) particles to a reaction temperature of from 400 ° C. to 800 ° C. to form mixed-metal oxide particles,
   where:
   the adamantane-intercalated LDH particles have
   a length and a width;
   a general formula $[M_{1-x}Al_x(OH)_2](A)_x \cdot mH_2O$, where x is from 0.14 to 0.33, m is from 0.33 to 0.50, M is chosen from Mg, Ca, Co, Ni, Cu, or Zn, and A is adamantane carboxylate; and
   an aspect ratio greater than 100 where the aspect ratio is defined by the width of an adamantane-intercalated LDH particle divided by the thickness of the adamantane-intercalated LDH particle; and
   the mixed-metal oxide particles comprise a mixed-metal oxide phase containing M, Al, and carbon.

2. The method of claim 1 where the mixed-metal oxide particles further comprise an oxide phase having a formula MO.

3. The method of claim 1 where the mixed-metal oxide particles comprises less than 5 wt %, by weight of the mixed-metal oxide particles, of spinel-phases having a formula $MAl_2O_4$.

4. The method of claim 1 where the mixed-metal oxide particles do not include any spinel-phases having a formula $MAl_2O_4$.

5. The method of claim 1 where the mixed-metal oxide particles consist essentially of the mixed-metal oxide phase and an oxide phase having a formula MO, and the mixed-metal oxide particles do not include any spinel-phase having a formula $MAl_2O_4$.

6. The method of claim 5 where the mixed-metal oxide phase is positioned between chains of the oxide phase.

7. The method of claim 1 where the heating up to the reaction temperature is at a heating rate of 4 to 6° C/min.

8. The method of claim 7 where the heating involves holding at the reaction temperature for at least 4 hours.

9. The method of claim 7, where M is Mg.

10. The method of claim 1 where the heating of the adamantane-intercalated layered double-hydroxide (LDH) particles is from an initial temperature of 20° C. to 30° C. to the reaction temperature of 400° C. to 800° C.

* * * * *